(12) United States Patent
Marsh et al.

(10) Patent No.: US 6,213,080 B1
(45) Date of Patent: Apr. 10, 2001

(54) ELECTRONICALLY CONTROLLED CONTINUOUS LUBRICATING OIL REPLACEMENT SYSTEM

(75) Inventors: Jerry L. Marsh, Seymour; John C. Kirchman; David E. Koeberlein, both of Columbus, all of IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/388,378

(22) Filed: Sep. 1, 1999

Related U.S. Application Data

(63) Continuation-in-part of application No. 09/031,669, filed on Feb. 27, 1998, now Pat. No. 5,970,942, which is a continuation-in-part of application No. 08/886,118, filed on Jun. 30, 1997, now abandoned, which is a continuation-in-part of application No. 08/608,305, filed on Feb. 28, 1996, now Pat. No. 5,749,339.

(51) Int. Cl.$^7$ ..................................................... F02B 33/04
(52) U.S. Cl. ................................ 123/196 R; 123/73 AD; 123/196 S
(58) Field of Search ........................... 123/196 R, 196 S, 123/73 AD

(56) References Cited

U.S. PATENT DOCUMENTS

| | | |
|---|---|---|
| 3,057,436 | 10/1962 | Jacobson et al. . |
| 3,447,636 | 6/1969 | Bonfilio . |
| 4,012,012 * | 3/1977 | Ligler .............................. 123/196 S |
| 4,080,946 * | 3/1978 | Cunningham ................... 123/196 S |
| 4,208,879 | 6/1980 | Segawa . |
| 4,417,561 | 11/1983 | Yasuhara . |
| 4,421,078 | 12/1983 | Hurner . |
| 4,495,909 | 1/1985 | Hurner . |
| 4,750,456 | 6/1988 | Ladrach ........................... 123/196 S |
| 4,852,351 | 8/1989 | Price . |
| 4,869,346 | 9/1989 | Nelson . |
| 5,372,219 * | 12/1994 | Peralta ............................. 123/196 S |
| 5,390,762 | 2/1995 | Nelson . |
| 5,431,138 | 7/1995 | Hurner . |
| 5,452,695 * | 9/1995 | Bedi ................................ 123/196 A |
| 5,562,181 * | 10/1996 | Elkin et al. ..................... 123/196 R |
| 5,685,396 * | 11/1997 | Elkin et al. ..................... 123/196 R |
| 5,701,862 | 12/1997 | Inoue et al. ..................... 123/196 S |
| 5,749,339 | 5/1998 | Graham et al. ................. 123/73 AD |
| 5,881,688 | 3/1999 | Graham et al. ................. 123/73 AD |
| 5,970,942 * | 10/1999 | Koeberlein et al. ............ 123/73 AD |

\* cited by examiner

*Primary Examiner*—Tony M. Argenbright
*Assistant Examiner*—Jason Benton
(74) *Attorney, Agent, or Firm*—Nixon Peabody LLP; Charles M. Leedom; Tim L. Brackett, Jr.

(57) ABSTRACT

An improved method and system for automatically continuously removing an engine's used lubricating oil and injecting the used oil into the engine's fuel system throughout operation based on engine operating conditions is disclosed. The present system includes a lube oil replacement pump system for injecting small amounts of used lube oil into the engine's fuel system and recycling controlled quantities of removed used oil into the engine's lube oil system. The process periodically determines an engine operating severity value, i.e. fuel consumption value, for an interval of engine operation and calculates a base line quantity of oil for injection based on the current fuel consumption of the engine during the current interval. The lube oil pump system may be in the form of a compact, unitized lube oil replacement pump assembly integrating the various components of the system. The system maintains the oil concentration in the engine's fuel at an acceptable level while permitting existing oil level detecting and maintenance systems or procedures to be used to maintain the lube oil level in the engine sump.

11 Claims, 15 Drawing Sheets

ELECTRONICALLY CONTROLLED CONTINUOUS LUBRICATING OIL REPLACEMENT SYSTEM

This application is a continuation-in-part application of application Ser. No. 09/031,669, filed Feb. 27, 1998 now U.S. Pat. No. 5,970,942, which is a continuation-in-part of application Ser. No. 08/886,118, filed Jun. 30, 1997 now abandoned, which is a continuation-in-part application of Ser. No. 08/608,305, filed Feb. 28, 1996, now U.S. Pat. No. 5,749,339.

TECHNICAL FIELD

This invention relates to a pump assembly for replacing an engine's used lubricating oil with fresh lubricating oil throughout engine operation.

BACKGROUND OF THE INVENTION

It is highly desirable to be able to minimize the amount of service required for internal combustion engines to thereby minimize the interruption in the use of the vehicle/equipment. Degradation and contamination of engine lubricating oil during engine use requires oil changing procedures which account for a significant portion of the maintenance and associated engine "down time". Conventional periodic oil changes generate an accumulation of waste lubricating oil which must be disposed of and/or processed resulting in undesirable costs. Therefore, extending oil drain intervals and reducing waste disposal are of great value to vehicle/equipment operators.

Consequently, systems have been developed for automatically changing internal combustion engine crankcase oil during engine operation. For example, U.S. Pat. No. 3,447,636 discloses a system for automatically changing engine oil while the engine is operating. The system operates to drain substantially all of the used oil from the engine immediately prior to introducing fresh oil into the engine from a reservoir. The single operation process results in a complete change of the substantially the entire engine oil volume. However, draining the engine prior to refilling with fresh oil necessarily creates a risk that an inadequate supply of lube oil exists in the engine for an interim time period possibly resulting in damage or excessive wear to engine components from insufficient lubrication. Moreover, this system undesirably results in a quantity of waste oil.

Other systems have been developed which automatically change engine lube oil during engine operation while avoiding a waste quantity of oil by directing the used lube oil into the fuel system for burning with the fuel in the engine. These systems periodically drain a small amount of the used oil from the engine lube oil system, and replace the drained quantity with fresh lubricant from an auxiliary tank. For example, U.S. Pat. Nos. 4,869,346 and 5,390,762 to Nelson disclose an automatic crankcase oil change and makeup system including a displacement unit having a piston with a predetermined stroke set to deliver identical, predetermined amounts of fresh oil during each stroke at the same flow rate and volume as the extraction of used oil. The pressure of the used lubricating oil is used to cause the periodic addition of the fresh oil to the crankcase. The frequency of the pressure strokes is set by a timer in an electronic controller, and is adjustably set to stroke at fixed time intervals to provide a cumulative quantity of fresh oil to the crankcase according to the regular recommended oil change period for the particular engine. A pair of dials on the controller enable the frequency of the pressure strokes to be adjusted. However, during certain engine operating conditions, e.g. idle conditions, the engine lube oil supply pressure may too low to overcome the biasing force of the piston spring, an outlet check valve biasing pressure and any frictional counterforces. As a result, the piston may not be moved through its makeup stroke during certain engine operating conditions, thereby preventing oil replacement and makeup during these low pressure conditions.

U.S. Pat. Nos. 4,421,078; 4,495,909; and 5,431,138 to Hurner disclose similar systems for oil changing and making up during engine operation which include a control module having an adjustable impulse timer set to periodically cycle an air pressure operated oil extractor pump at a fixed time intervals to direct a predetermined amount of engine oil out of the oil pan and into the fuel tank. Fresh makeup oil is pumped from an oil reservoir to the crankcase, also by air pressure, in response to a low level signal from a dipstick sensor. However, the oil changing portion of each of these systems is formed as a separate assembly from the make-up portion of the system. Also, these systems require the use of pressurized air to actuate the oil changing/removing device. As a result, this system may be difficult and expensive to integrate into an engine.

U.S. Pat. No. 4,417,561 to Yasuhara discloses an automatic oil changing and disposing apparatus wherein used crankcase oil is periodically directed to a fuel tank via a valve controlled by an odometer switch, and fresh oil is gravity fed from a fresh oil tank to the crankcase via a control valve controlled by a crankcase oil level switch. The quantity of each increment of used oil removed from the crankcase, and each increment of fresh oil supplied, is controlled by respective timers having variable on-time duration to effect variable control of engine oil extraction and addition. Alternatively, a float type valve arrangement can be used to control the delivery of the fresh oil to the crankcase. However, in the systems disclosed in the Hurner references and Yasuhara, fresh oil may be delivered to the crankcase during engine operation after significant amounts of used oil have been removed and only when the fresh oil tank level drops a predetermined low level. This undesirable delay in supplying fresh oil to the engine results in a significant decrease in the quantity of lubricating oil in the lubricating oil system of the engine thus creating the possibility that too little oil will be available to the engine. Moreover, the repeated extraction of used oil without periodic, corresponding additions of fresh oil, fails to adequately maintain the quality of the lubricating oil in the engine at a sufficient level to ensure optimum engine lubrication and cooling.

Although capable of automatically changing lube oil during engine operation, the automatic oil changing systems discussed hereinabove are incapable of accurately varying and controlling oil changing in response to the actual needs of the engine that vary based on the engine operating conditions, such as fuel consumption. The amount of oil drained from the crankcase and injected into the fuel system is often either less than the necessary replacement rate when the engine is being used more heavily than expected, or more than the optimum amount when the engine is being used less heavily than expected. Injecting too little used oil from the oil sump into the fuel system will disadvantageously result in engine damage from over-used oil incapable of adequately lubricating and cooling engine components. On the other hand, injecting too much oil results in excessive concentrations of used oil in the fuel resulting in engine performance degradation, increased emissions, shortened fuel filter life and wasted oil. In addition, if the engine is a recent emission regulated engine, injecting too much oil into the fuel system will result in emission non-compliance and possibly a fine. Although Yasuhara '561 suggests variable control of engine oil extraction and addition, this reference does not suggest means for accomplishing such variable control nor the engine operating parameters to be considered. The Nelson '346 and '762 references only suggest varying the amount of oil extracted and added to the engine crankcase by manually adjusting timers to vary the frequency of oil additions and extractions.

Also, the systems discussed hereinabove fail to adjust the quantity of oil to be injected from the lube oil system into the fuel system based on the amount of additional fresh oil added to the oil sump beyond the quantity extracted. For example, the systems disclosed in the Nelson patents operate to deliver an amount of fresh oil, during each stroke of the displacement unit, to replace the amount of used oil removed. The Nelson system also operates to deliver additional amounts of fresh oil when the oil sump level decreases below a predetermined level due to, for example, oil leakage or burning in the engine. However, the Nelson system continues to remove and replace oil at a predetermined frequency. As a result, these systems replace more oil than is necessary to maintain cooling and lubricant qualities of the oil at the desired level, resulting in wasted oil and increased costs.

Therefore, there is a need for a continuous engine lube oil replacement system capable of more effectively controlling the quantity of used lube oil burned in the engine based on varying engine operating conditions.

SUMMARY OF THE INVENTION

It is an object of the present invention, therefore, to overcome the disadvantages of the prior art and to provide a continuous lube oil replacement for an engine capable of reliably, accurately and effectively controlling the rate at which lube oil is replaced in the engine's lube oil system.

It is another object of the present invention to provide a continuous oil replacement system capable of burning only the optimal quantity of lube oil in the engine's fuel system.

It is yet another object of the present invention to provide a continuous oil replacement system which eliminates oil changes so as to minimize engine down time.

It is a further object of the present invention to provide a continuous oil replacement system which accurately and effectively maintains the oil concentration in the engine's fuel system at a level necessary to maintain emissions compliance.

It is a still further object of the present invention to provide a continuous oil replacement system which maintains the quality of the engine lube oil at a level necessary to provide optimal engine protection.

Still another object of the present invention is to provide an electronically controlled continuous oil replacement system capable of optimally controlling the amount of waste oil directed into the engine's fuel system based on varying engine operating conditions to achieve optimum engine lubrication at reduced costs during all engine operating conditions.

Another object of the present invention is to provide an electronically controlled continuous oil replacement system which continuously monitors and maintains the engine lube oil sump at the proper level thereby eliminating the costs and risks associated with manual inspections by the vehicle operator.

Yet another object of the present invention is to provide an electronically controlled continuous oil replacement system which eliminates the need to dispose of used engine oil.

Still another object of the present invention is to provide an electronically controlled continuous oil replacement system which avoids excessive engine oil consumption under light engine loads and unacceptable oil contamination under heavy engine loads.

Another object of the present invention is to provide an inexpensive electronically controlled continuous oil replacement system which can be easily retrofit on existing engines and integrated into new engines.

Still another object of the present invention is to provide an electronically controlled continuous oil replacement system which automatically continuously monitors various components and parameters of the engine lube oil system and the oil replacement system and provides warning indications of any abnormal conditions.

It is a further object of the present invention to provide an electronically controlled continuous oil replacement system which accurately and effectively maintains the oil concentration in the engine's fuel system at a level necessary to maintain sulfur concentration in the fuel at an acceptable level.

Yet another object of the present invention is to provide an electronically controlled continuous oil replacement system which also functions to add makeup lube oil to the engine's lube oil system to compensate for oil leakage from, or burning in, the engine, while adjusting the continuous replacement process to compensate for the makeup oil to avoid overreplacement of the oil.

Therefore, another object of the present invention is to provide an electronically controlled continuous oil replacement system which maintains optimal replacement of used engine oil while adding oil to compensate for oil leakage and burning in the engine.

Still another object of the present invention is to provide a compact, inexpensive and lightweight lube oil pump assembly capable of effectively removing used oil from an engine and delivering fresh oil to the engine.

Yet another object of the present invention is to provide a unitized, compact lube oil pump assembly including two pump pistons wherein one piston can be operated independently without operating the other piston to permit makeup oil delivery without removal and injection of used oil to the fuel system.

Another object of the present invention is to provide a lube oil pump system wherein makeup oil is delivered to the engine simultaneously with the injection of used oil into an engine's fuel system and subsequent to removal of used oil from the engine lube oil system.

Yet another object of the present invention is to provide a lube oil pump system capable of effectively removing used oil and delivering makeup oil to the engine during periods of engine operation when the engine lube oil supply is at a low pressure, e.g. idle conditions.

Another object of the present invention is to provide a lube oil pump system which includes a single dual diameter piston sized to ensure effective lube oil makeup during periods of engine operation when the engine lube oil supply is at a low pressure, e.g. idle conditions.

Still another object of the present invention is to provide a lube oil pump system which includes a single piston and a minimum number of control valves while preventing an additional makeup quantity upon engine start-up.

These and other objects are achieved by providing an electronically controlled lube oil replacement system for an engine capable of consuming fuel, comprising an engine lube oil supply including a lube oil supply circuit for delivering a supply of lube oil to the engine, a lube oil injection circuit connected to the lube oil supply circuit for permitting an injection flow of lube oil from the lube oil supply circuit, an engine lube oil injection control device positioned along the lube oil injection circuit for controlling the injection flow of lube oil to define a lube oil injection rate, an engine operating condition detecting device for detecting at least one operating condition and generating an engine operating condition signal indicative of the engine operating condition or mode, and a processor for receiving the engine operating condition signal, calculating a engine operating severity value based on the engine condition signal and generating an injection flow control signal based on the engine operating severity value, wherein the injection flow control signal controls the operation of the injection control device to variably control the injection rate. The engine operating severity value may be a fuel consumption value corresponding to the engine fuel consumption rate or total quantity for a current interval. The lube oil injection circuit may be connected to a fuel supply system for injecting lube oil into the fuel supply system for burning. The replacement system may also include an auxiliary lube oil supply including an auxiliary lube oil supply circuit for providing an auxiliary supply flow of lube oil to the main lube oil supply and an auxiliary lube oil tank containing a supply of auxiliary lube oil. The present replacement system may also include an auxiliary lube oil flow control device positioned along the auxiliary lube oil supply circuit for controlling the auxiliary supply flow of clean lube oil to the engine lube oil supply to define an auxiliary supply flow rate. The processing means may generate a flow control signal for controlling the operation of the auxiliary lube oil flow control device so as to variably control the auxiliary supply flow rate. The engine lube oil supply may include a lube oil sump containing an accumulated supply of lube oil while the auxiliary lube oil may include an auxiliary lube oil tank. The auxiliary lube oil supply circuit may connect the auxiliary lube oil tank to the lube oil sump for delivering an auxiliary supply flow to the main sump. A lube oil sump level sensor may also be provided to detect the oil level in the sump and generate a corresponding level signal. The processing means may receive the level signal and generate an auxiliary control signal for controlling the operation of the auxiliary supply flow control device to maintain the sump oil level at an acceptable level. The engine lube oil injection control device may include an injection pump intermittingly operated to pump a predetermined quantity of lube oil into the fuel supply system. The auxiliary flow control device may include a similar injection pump for directing predetermined quantities of auxiliary lube oil into the sump. An electronic control module may be provided for controlling engine operation and providing the engine condition signal to the processing means. The engine condition signal may be an integrated fuel consumption rate with respect to time, or an alternative value. The processor may be an electronic controller including an input for receiving the engine condition signal and an output for providing the injection flow control signal. The processor may calculate a fuel consumption value based on the engine condition signal, process the fuel consumption value to determine the quantity of oil to be injected, generate an output signal based on the quantity oil to be injected and provide the output signal to the output. The electronic controller may further include an engine configuration storage device connected with the processor for storing engine configuration information. The processor may process the fuel consumption by accessing the engine configuration storage device and retrieving an oil change value corresponding to the quantity of oil to be injected into the fuel system based on the fuel consumption value.

In the method of the present invention, the quantity of oil to be injected is determined at periodic intervals throughout engine operation based on a predetermined time variable or a predetermined mileage variable or combination thereof. The injection control device is capable of injecting a predetermined unit injection quantity upon receipt of the output signal so that the timing of injection of the predetermined unit injection quantity during engine operation is dependent on the fuel consumption value. The method may also include the step of adding the quantities of oil to be injected for a plurality of periodic intervals to define a cumulated oil quantity to be injected. The cumulated quantity of oil to be injected may then be compared to the predetermined unit injection quantity. The output signal is provided to the injection control device when the cumulated oil quantity to be injected is greater than the predetermined unit injection quantity. The method may also include the step of detecting oil temperature, generating a temperature signal indicative of the oil temperature and adjusting the quantity of oil to be injected based on the temperature signal. A step may also be included for accessing from a soot information storage device to retrieve a soot value. The quantity of oil is then adjusted based on the soot value. The method may also include the step of adjusting the quantity of oil to be injected based on a quality characteristic of the lube oil.

The present lube oil replacement system also includes a diagnostic system and method for determining an engine sump oil level and providing a first control signal to the auxiliary flow control device to inject a first quantity of auxiliary oil from the auxiliary lube oil tank to the engine sump when the engine sump oil level is below an acceptable level. The diagnostic method may include the step of redetermining the engine sump oil level after injection with the first quantity of auxiliary oil determining an auxiliary oil level in the auxiliary oil tank when the engine sump level is unacceptable and generating a fault signal for alerting an operator when the auxiliary oil tank level is low. Moreover, this method may include the step of determining whether the auxiliary flow control device is functioning properly when the engine sump oil level is higher than an acceptable level and generating a fault signal for alerting an operator when the auxiliary flow control device is functioning improperly. The method may also include the step of checking the proper functioning of the flow control device after determining the auxiliary oil level in the auxiliary oil tank.

The method of the present invention preferably also includes a step of adjusting the continuous replacement process to compensate for makeup oil delivered to the engine by the auxiliary lube oil system as determined by the diagnostic system to compensate for normal oil consumption by the engine, i.e. oil leakage and burning in the engine, to maintain the engine sump level within a predetermined range. Specifically, the present system adjusts the quantity of used oil to be removed from the engine lube oil system over time based on the quantity of fresh makeup oil supplied thereby preventing overreplacement of the lube oil in the engine. The method includes the step of determining the quantity of makeup oil injected into the lube oil system wherein the quantity may be in the form of a total makeup quantity value based on, for example, the number of makeup injections performed by the auxiliary flow control device. This total makeup quantity value may then be used to adjust the base line quantity of oil to be injected. The greater the quantity of makeup oil injected, the greater the downward adjustment in the base line quantity of used oil to be removed from the lube oil system and injected into the fuel system.

The injection control device and auxiliary flow control device may be electronically controllable as a single lube oil pump system including a solenoid operated control valve for controlling the flow of an actuating fluid to control the operation of the injection pump and the auxiliary pump. The solenoid operated control valve is preferably movable between first and second positions, wherein movement into the first position causes a piston in the injection pump to move through an injection stroke and an auxiliary piston in the auxiliary pump to move through a discharge stroke. The injection piston may be positioned in an injection piston bore to form an injection actuation chamber adjacent one end of the injection piston and an injection removal chamber positioned on an opposite side of the injection piston for receiving removed oil to be injected into the fuel system. A second solenoid operated control valve may be provided for selectively controlling the flow of removed oil to and from the injection removal chamber. The auxiliary piston may be positioned in an auxiliary piston bore to form an auxiliary actuation chamber adjacent one end of the piston and an auxiliary discharge chamber positioned adjacent an opposite end of the auxiliary piston for receiving fresh oil to be injected into the engine lube oil system. The actuating fluid is preferably pressurized engine lube oil from the engine lube oil system. The first solenoid operated control valve controls the flow of actuating fluid to and from both the injection actuation chamber and the auxiliary actuation chamber. Preferably, pressurized oil from the engine lube oil system acts on a first end of the auxiliary piston to force a second end of the auxiliary piston against fresh oil so as to pressurize the fresh oil. The first end of the auxiliary piston preferably has a greater cross sectional area than a cross sectional area of the second end to create a pressure intensification effect. Preferably, the first and second solenoid operated control valves are three-way, two-position valves.

The injection piston is preferably reciprocally mounted for movement through an injection stroke and a removal stroke wherein a fixed quantity of used oil is removed during each removal stroke to define a removal period. The auxiliary pump is preferably operable in a replacement mode for supplying fresh oil to the engine lube oil system to replace the oil removed by the injection pump and in a makeup mode for supplying makeup oil to the engine lube oil system to compensate for oil consumed by the engine. The auxiliary piston is preferably mounted for reciprocal movement through a suction stroke and a discharge stroke wherein the auxiliary piston discharges a first fixed quantity of fresh oil to the engine fuel system during each discharge stroke to define a first replacement period. The first fixed quantity of fresh oil is approximately half of the fixed quantity of used oil and the first replacement period preferably occurs substantially subsequent to the removal period. The second control valve is preferably operable to prevent movement of the injection piston through the removal stroke while the auxiliary pump is being operated in the makeup mode.

The lube oil replacement pump assembly of the present invention comprises a pump housing including a housing body, an injection bore, an auxiliary bore positioned adjacent the injection bore and a first housing end plate mounted on a first end of the housing body for closing one end of at least one of the injection and auxiliary bores. The auxiliary and injection pistons are reciprocally mounted in the respective bores for movement through the strokes mentioned hereinabove, and a control valve arrangement is mounted on the pump housing for controlling the flow of lube oil to and from the injection and auxiliary bores to create a compact, unitized assembly. Preferably, the control valve arrangement includes both the first and second solenoid operated control valves which are mounted on the first housing end plate. The injection and auxiliary bores preferably extend along parallel longitudinal axes. A fresh oil delivery passage and a removed oil delivery passage extend from the first end to the second end of the housing body for directing fresh oil and removed oil toward the first and second control valves. The assembly also includes a drain circuit for draining lube oil from the injection and auxiliary bores to a low pressure portion of the engine lube oil system. The drain circuit includes a common drain passage formed in the housing body for receiving a flow of fresh oil from the auxiliary bore during the discharge stroke of the auxiliary piston and a respective flow of used oil from the injection and auxiliary bores during respective removal and suction strokes. The pump housing may include a second housing end plate for closing an opposite end of each of the auxiliary and injection bores. Each of the end plates include a side face positioned adjacent the housing body and at least one passage groove formed in, and extending along, the side face for providing oil flow to and from at least one of the injection and auxiliary bores. The assembly may include at least three check valves mounted in the second end plate for permitting an unimpeded suction flow of fresh oil into one end of the auxiliary bore. A coil spring may be mounted in the auxiliary bore for moving the auxiliary piston through the suction stroke.

BRIEF DESCRIPTION OF THE DRAWINGS

FIG. 12c is a cross-sectional view of the upper end plate taken along plane 12c—12c in FIG. 12a;

DETAILED DESCRIPTION OF THE INVENTION

Figure 1:
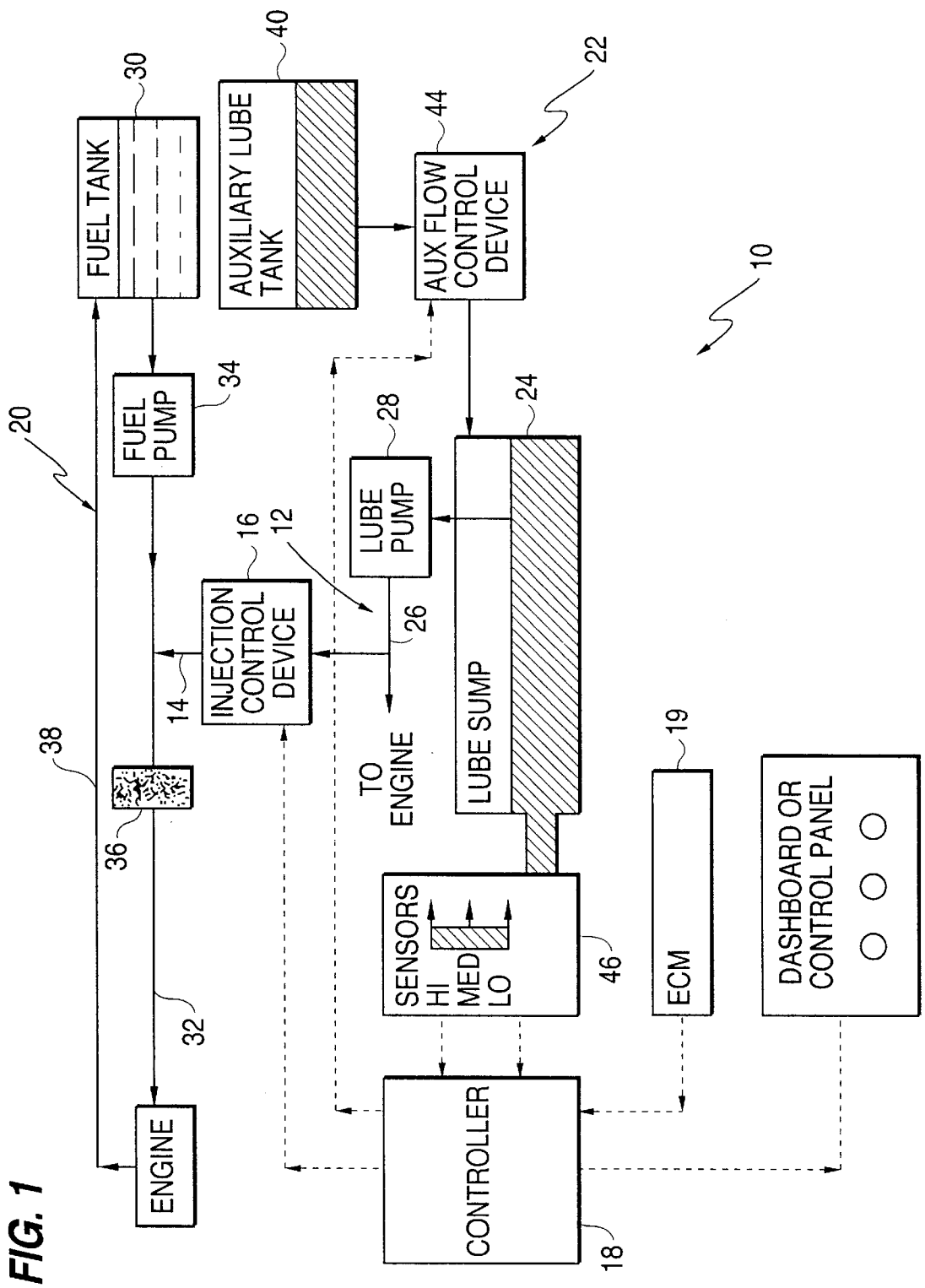
FIG. 1 a schematic diagram of the continuous lube oil replacement system of the present invention.

Referring to FIG. 1, the continuous lube oil replacement system of the present invention indicated generally at 10 includes an engine lube oil supply system 12 for supplying lubricating fluid or oil to an engine for lubricating and cooling engine components, a lube oil injection circuit 14 for draining small quantities of used lube oil from the engine lube oil circuit, an injection control or metering device 16 positioned along the lube oil injection circuit 14 for controlling the injection rate of lube oil from the engine lube oil supply circuit and a controller 18 for determining an optimum injection rate of lube oil in response to engine operating conditions and controlling injection control device 16 to achieve the optimum injection rate. The continuous lube oil replacement system 10 may be used to inject the lube oil into an engine fuel system, indicated generally at 20, for mixing and burning with the fuel in the engine's combustion chamber. Oil replacement system 10 also preferably includes an auxiliary lube oil supply system indicated generally at 22 for supplying new lube oil to the lube oil supply circuit. The present oil replacement system 10 advantageously removes predetermined quantities of used oil from the engine lube oil system 12 throughout the operation of the engine based on specific engine characteristics and operating conditions to create an optimum drain or injection rate while supplying controlled quantities of new oil to engine lube oil system 12. As a result, the present system maintains the lube oil concentration in the fuel below a predetermined level necessary to maintain emissions within acceptable limits while also maintaining the lube oil in the engine lube oil system 12 at a quality necessary to achieve optimum engine lubrication and cooling throughout extended periods of engine operation without incurring the down-time and costs associated with complete one-time engine lube oil replacement.

The engine lube oil supply system 12 includes an engine lube oil crankcase or sump 24, a lube oil supply circuit 26 for delivering lube oil to the engine and a lube oil pump 28 positioned along supply circuit 26 for drawing lube oil from sump 24 and providing a pressurized flow of lube oil to the engine. Throughout operation of the engine, lube oil is delivered to the engine for lubricating and cooling various engine components and then returned to oil sump 24. Without proper lube oil replacement or replacement, the ability of the oil to lubricate and cool gradually decreases during use due to oil degradation and contamination. The present system provides optimal oil replacement to maintain the quality of the lube oil while also maintaining emissions fuel sulfur content within acceptable limits.

The lube oil injection circuit 14 connects at one end to engine lube oil supply circuit 26 downstream of lube oil pump 28 and at an opposite end to the engine fuel system 20. Engine fuel system 20 may be any conventional engine fuel system for delivering fuel to the engine. For example, as shown in FIG. 1, fuel system 20 includes a fuel tank 30 and a fuel supply circuit 32 connecting fuel tank 30 to the engine. Fuel system 20 further includes a fuel pump 34 positioned along fuel supply circuit 32 and a fuel filter 36 positioned between pump 34 and the engine. A fuel return line 38 returns unused fuel from the engine to fuel tank 30.

Lube oil injection circuit 14 preferably connects to fuel system 20 along fuel supply circuit 32 between fuel pump 34 and fuel filter 36. However, alternatively, injection circuit 14 may be connected to fuel return line 38, the fuel tank 30 or to fuel supply circuit 32 immediately upstream of fuel pump 34, i.e. fuel pump inlet. It has been found that directing the lube oil into the fuel pump inlet provides improved mixing of the fuel and lube oil while also enhancing lubrication of fuel pump 34. Lube oil injection control or metering device 16 is positioned along lube oil injection circuit 14 to control the injection of lube oil from sump 24 and injection into fuel supply circuit 32. Lube oil control device 16 is preferably the solenoid-operated piston type disclosed in U.S. Pat. Nos. 4,421,078 and 4,495,909, which are hereby incorporated by reference, wherein a cylinder contains a movable piston defining opposed chambers. One chamber receives lube oil from the lube oil supply circuit 26 via a solenoid valve while the opposite chamber communicates with a pressurized driving fluid via a respective solenoid. The oil delivered from circuit 26 into the chamber is pumped into fuel system 20 as the piston moves in response to a pressurized driving fluid entering the opposite chamber. The driving fluid may be pressurized air or the lube oil from the engine lube oil supply system. Each time lube oil control device 16 is operated, as dictated by controller 18, the solenoid valves of control device 16 are actuated to control the flow of lube oil and driving fluid in a manner to inject a predetermined amount of lube oil from one chamber into fuel system 20. The amount of lube oil injected during each actuation of injection control device 16 is determined by the size of the chamber and the fixed stroke of the piston. Preferably, the volume of the chamber, and therefore the volume of lube oil injected, is relatively small, for example, one ounce. By injecting small quantities of lube oil periodically over the operation period of the engine, the present system is more capable of precisely controlling the concentration of lube oil in the fuel so as to maintain emissions within acceptable limits throughout engine operation.

Of course, lube oil control device 16 may be any metering or pumping device capable of being selectively operated to inject a precise quantity of lube oil. For example, lube oil control device 16 may be a solenoid operated two-way valve movable between open and closed positions. A flow restriction orifice is preferably incorporated in the control valve or provided immediately downstream to limit the quantity of lube oil per unit time. The amount of lube oil injected is therefore is determined primarily by the amount of time the solenoid valve remains in the open position and secondarily by the lube oil pressure. Therefore, instead of delivering a fixed quantity of lube oil during each actuation as does the solenoid operated piston pump previously discussed, the solenoid valve of this embodiment could be actuated and held in the open position for a period of time necessary to inject any desired predetermined amount of lube oil. Alternatively, lube oil control device 16 may be of the type disclosed in U.S. Pat. No. 5,431,138.

Auxiliary lube oil supply system 22 includes an auxiliary lube oil tank 40 containing a reserve or auxiliary supply of lube oil and an auxiliary lube oil supply circuit 42 fluidically connecting tank 40 to lube oil sump 24. The system 22 further includes an auxiliary lube oil supply flow control or metering device 44 positioned along auxiliary supply circuit 42 for controlling the flow of auxiliary oil to sump 24. Lube oil supply control device 44 is preferably the same type of solenoid operated piston pump as injection control device 16 described hereinabove. Upon receipt of an actuation signal from controller 18, auxiliary lube oil flow control device 44 operates to inject a fixed quantity of lube oil. Of course, like injection control device 16, auxiliary oil flow control device 44 may alternatively be a solenoid-operated two-way valve capable of injecting variable quantities of lube oil as described hereinabove. The lube oil level in sump 24 is monitored during engine operation via sensors mounted in a sensing chamber 46 mounted external, but fluidically connected to, sump 24. When the oil level in sump 24 reaches a predetermined level below the normal operating level, controller 18, which receives level signals from the level sensors, actuates auxiliary lube oil flow control device 44 to inject auxiliary lube oil so as to maintain a predetermined level in sump 24. Alternatively, a float-type device may be used in combination with a gravity drain version of the present system. In this embodiment, auxiliary tank 40 must be positioned above sump 24 and a valve positioned in the auxiliary supply circuit 42 is controlled by the float-type device such that the valve is opened when the oil level in sump 24 is low and closed when the oil level reaches an acceptable predetermined level.

Alternatively, the system may be designed to detect sump oil level only prior to each engine start-up, when the level can be accurately detected, instead of continuously or intermittently throughout engine operation. In over-the-road vehicles applications, the sump oil level may be difficult to accurately detect due to churning of the oil by the engine crankshaft and vehicle movement. By only detecting sump level during engine shut-down, an accurate sump level can be detected. If the sump level is below an acceptable level, than the auxiliary flow control device can be operated to add the necessary amount of oil to the sump.

In an alternative embodiment, the auxiliary system may include a dual function flow control device which in a single operation injects the same amount of fresh oil into sump 24 and used oil from the sump into the fuel system. The dual function flow control device may, for example, be similar to that disclosed in U.S. Pat. No. 4,869,346. Thus, when the system of the present invention signals the dual function flow control device to inject a quantity of used lube oil into the fuel system, the flow control device will operate to remove a unit injection quantity from the sump while delivering an identical quantity of fresh oil to the sump. Since the oil level in sump may fall below a predetermined level due to oil leakage from the engine or gradual oil burning in the engine, this embodiment may include an automatic used oil recirculation system. If the sump level is substantially below the predetermined level, then at least a portion of the quantity of used oil to be injected is returned to the sump until an acceptable level is reached.

In yet another alternative embodiment, a dual function flow control device of the type discussed hereinbelow and shown in FIGS. 7–10, or the assembly version of FIGS. 11–14*d*, may be used.

Figure 2:
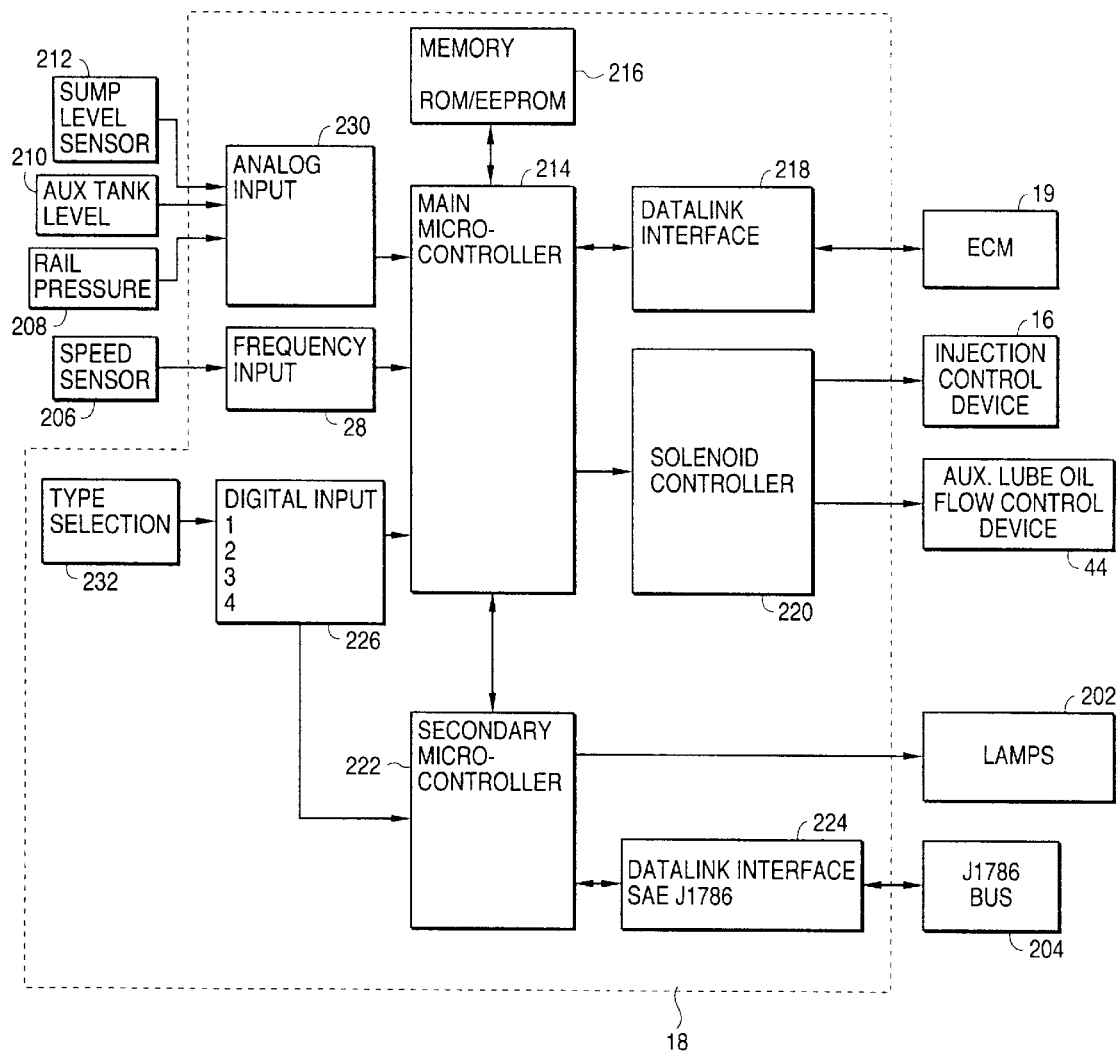
FIG. 2 is a schematic block diagram of a controller for use with the oil replacement system of the present invention.

FIG. 2 is a block schematic diagram of the control and operating circuitry of continuous oil replacement system 10. This circuitry may comprise the controller 18, injection control device 16, electronic control module 19, auxiliary lube oil flow control device 44, status indication lamps 202, J1786 bus 204, speed sensor 206, rail pressure sensor 208, auxiliary tank level sensor 210, and sump level sensor 212.

Controller 18 comprises main microcontroller 214, memory 216, datalink interface 218, solenoid controller 220, secondary microcontroller 222, SAE J1783 datalink interface 224, digital input 226, frequency input 228, analog input 230, and engine type selection switches 232.

As shown in FIG. 2, main microcontroller 214 is connected to memory 216, which is preferably an EEPROM containing a control program, initial setup data, and operating tables used by main microcontroller 214. The control program, data, and operating tables implement novel control algorithms which will be described in more detail below with reference to FIGS. 3–5.

Main microcontroller 214 has input ports connected to receive information from analog input 230, frequency input 228, and digital input 226. Main microcontroller 214 also has an input/output port connected to datalink interface 218 and an output port connected to solenoid controller 220. Main microcontroller 214 is further connected via a data bus to secondary microcontroller 222 which has input ports connected to digital input 226, output ports connected to signal lamps 202, and an input/output port connected to SAE J1783 datalink interface 224.

Solenoid controller 220 is connected to selectively actuate solenoids of injection control device 16 and auxiliary lube oil flow control device 44 under control of the program in main microcontroller 214. Solenoid controller 220 is a solenoid control circuit which receives a digital control signal from main microcontroller 214 and provides a high-current output to actuate the connected solenoids. Injection control device 16, when actuated under the control of main microcontroller 214, diverts oil from circuit 26 of the engine's lubricating oil system (shown in FIG. 1) to engine fuel system 20 (also shown in FIG. 1). Auxiliary lube oil flow control device 44, when actuated, transfers lubricating oil from auxiliary lube tank 40 (shown in FIG. 1) to lube sump 24 (also shown in FIG. 1).

As will be seen, the operating program of main microcontroller 214 uses engine operating condition inputs, such as fuel consumption, or speed and rail pressure inputs, to determine a fuel consumption value and, in real time, an appropriate rate of lubricating oil burning and replacement based on current operating conditions. Injection control device 16 and auxiliary lube oil flow control device 44 are controlled to provide the desired rates of lubricating oil burning and replacement.

FIG. 2 shows three different sets of connections for obtaining the needed fuel consumption information, but it will be understood that only one source of this information is needed. The inputs may be obtained from dedicated speed sensor 206 and rail pressure sensor 208 shown in FIG. 2. These inputs are preferred in cases where there is no electronic control module 19 or SAE J1786 bus 204 on the engine.

However, a conventional ECM for controlling injection metering for an electronic fuel injection system possesses the required fuel consumption information, i.e. instantaneous fuel consumption rate. Thus, in engines having an ECM 19, the ECM 19 will typically directly provide the required fuel consumption information. The fuel consumption information can be transmitted to main microcontroller 214 through datalink interface 218. Datalink interface 218 may be a serial bidirectional digital interface compatible with electronic control module 19, and may receive sensor or fuel consumption information and report the status of controller 18 and continuous oil replacement system 10 to ECM 19. In the case where ECM 19 is provided and ECM 19 provides the necessary fuel consumption information, it is not necessary to provide continuous oil replacement system 10 with a separate, dedicated speed sensor 206 and rail pressure sensor 208.

As a further alternative, the necessary engine operating information (speed and rail pressure), used to calculate the fuel consumption value, can be obtained by monitoring data transmissions on an SAE J1786 bus 204 if the engine is so equipped. In this case, controller 18 can operate using existing engine sensors and by communicating over SAE J1786 bus 204. Datalink interface 224 is a serial bi-directional interface compatible with the SAE J1786 bus standard. Secondary microcontroller 222 receives data packets through datalink interface 224 containing the desired speed and rail pressure information, and may transmit status information for continuous oil replacement system 10 over bus 204. Speed sensor 206, rail pressure sensor 208, and datalink interface 218 may all be omitted in this embodiment if the necessary data reception and status reporting functions can be performed over bus 204.

Engine type selection switches 232 may be DIP switches, jumpers, or other switch devices allowing an installer to configure the controller 18 for operation with one of a plurality of engines. The settings of engine type selection switches 232 are read by main microcontroller 214 through digital input 226 during startup, and these settings may then be used to select operating programs, data tables, sensor information input sources, and methods of information output, depending on the configuration of the engine and its electronic systems.

Analog input 230 is an analog-to-digital converter which provides main microcontroller 214 with a digital representation of the output signal level produced by analog sensors, such as the pressure and level sensors shown. Sump level sensor 212 and auxiliary tank level sensor 210 preferably provide a DC voltage output which varies with the respective oil levels monitored by these sensors. Rail pressure sensor similarly provides a DC voltage output varying with fuel injection rail pressure.

Frequency input 228 is a frequency counter which provides a digital representation of the frequency of a pulsed signal, such as the output of speed sensor 206 which may be, for example, a Hall-effect or optical sensor attached to a rotating engine shaft to produce a pulsed output signal, the frequency of which varies with engine speed.

Secondary microcontroller 222 is a microcontroller comprising RAM and ROM memory, input and output ports, and an operating program. The operating program receives digital inputs from engine type selection switches 232 and a digital control signal from main microcontroller 214. Based on these signals, secondary microcontroller 222 provides an output signal to control status indication lamps 202 in a manner which will be described in more detail below. In addition, secondary microcontroller controls datalink interface 224, transmitting information received from main microcontroller 214 over bus 204 and providing engine operating parameter information received over bus 204 to main microcontroller 214. Thus, secondary microcontroller 222 performs input and output processing functions to offload duties from main microcontroller 214.

Having discussed the structure of the continuous oil replacement system according to the present invention, the method used by the system to ensure proper engine oil replacement will now be discussed in more detail. Specifically, the most preferred embodiment of the present invention includes two fundamental processes—a first oil injection process for calculating the quantity of oil to be injected into the fuel system of the internal combustion engine based on the severity of engine operation as indicated by, for example, current fuel consumption, and for controlling the timing of the injection of such oil into the fuel system; and a second diagnostic process for monitoring the amount of available oil in lube sump 24, for replacing such amount from auxiliary oil tank 40 when necessary and for providing external indications of the condition of the oil replacement system to an operator of a vehicle.

As discussed above, in the most preferred embodiment of the present invention, both the oil injection process and the diagnostic process will be implemented in software contained in an oil replacement electronic control module, or controller 18, that includes a central processing unit such as a micro-controller, micro-processor, or other suitable microcomputing unit. The controller 18 receives appropriate inputs from the oil replacement system and from the internal combustion engine, and processes these inputs to determine the timing and quantity of oil injection and the appropriate oil replacement and diagnostic services.

Figure 3:
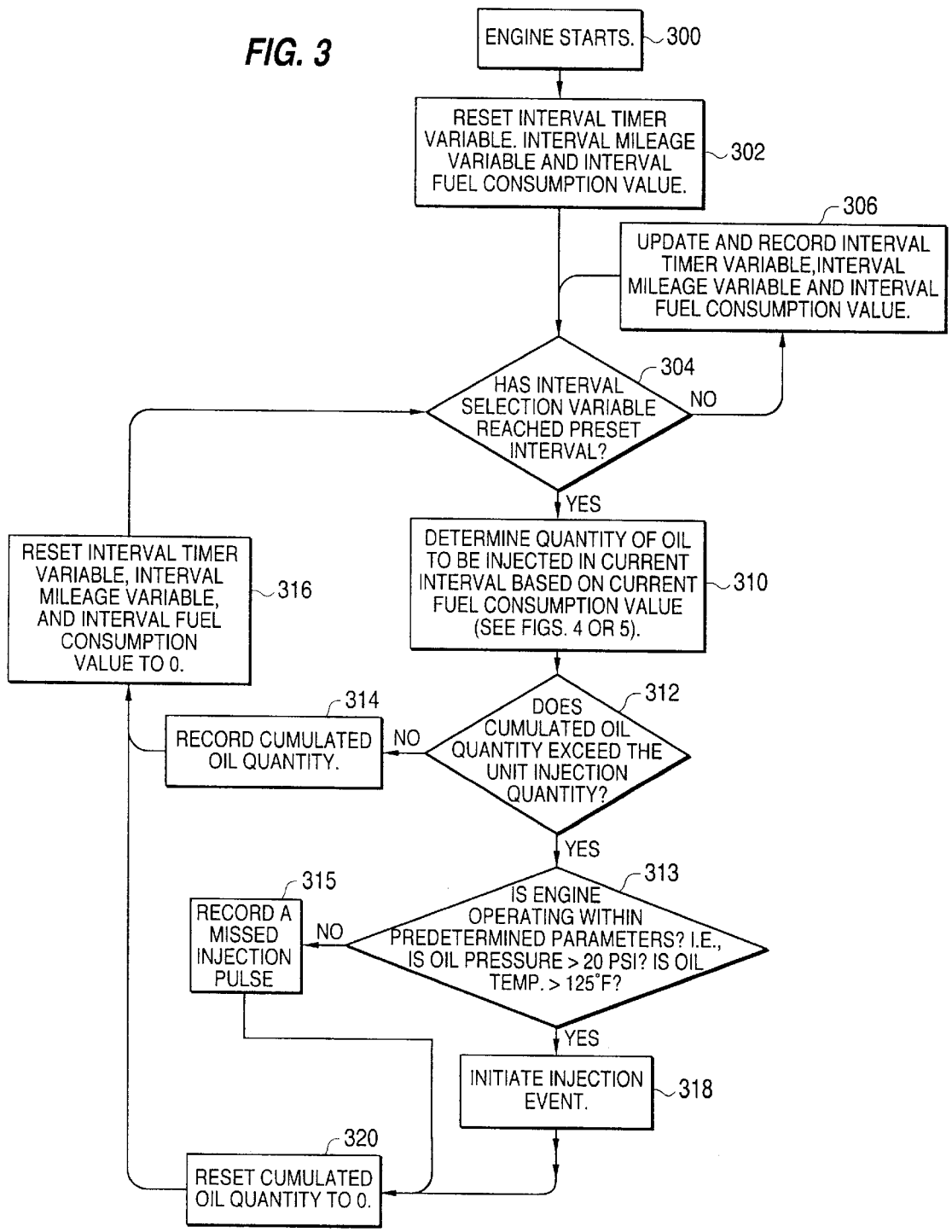
FIG. 3 is a flowchart illustrating an oil injection process for calculating the quantity of oil to be injected into the fuel system of the internal combustion engine and controlling the timing of the injection of such oil into the fuel system in accordance with the present invention.

Referring first to FIG. 3, a flowchart illustrating an oil injection process for calculating the quantity of oil to be injected into the fuel system of the internal combustion engine and controlling the timing of the injection of such in accordance with the present invention is shown. As can be seen in FIG. 3, the process begins at block 300 when an internal combustion engine containing an oil replacement system in accordance with the present invention is started. Upon starting of the internal combustion engine, the oil replacement controller 18 will be initialized and the control program contained therein executed, beginning in block 302.

In block 302, the oil replacement controller 18 will reset an interval timer variable, an interval mileage variable, and an interval fuel consumption value which are preferably stored within the central processing unit of the controller 18. As described below, the interval timer and interval mileage variables are used to specify an interval period which limits the iterations of steps used to determine the quantity of oil to be injected into the fuel system. Once the interval period is reached, the injection process will then proceed to determine a base quantity of oil to be injected into the engine's fuel system during the specified interval period based on the fuel consumption value.

One of the interval timer variable and interval mileage variable are used as an interval selection variable to specify the interval period with the selection of which variable is to be used primarily dependent upon the application in which the internal combustion engine is being used. That is, if the engine is used in an application in which mileage is a primary factor affecting engine wear, such as in an over-the-road vehicle, then the interval mileage variable will be used to determine the interval period. Conversely, if the engine is used in an application in which time of operation is a primary factor affecting engine wear, such as in a heavy earth moving vehicle, marine application or generator set, then the interval timer variable will be used to determine the interval period.

The process next transfers control to decisional block 304, where it is determined if the interval selection variable (i.e. either the interval timer variable or interval mileage variable depending on the specific engine application) has reached a preset interval. If not, control passes to block 306 where the interval timer variable and/or the interval mileage variable are updated and recorded within the controller 18 along with the interval fuel consumption value. Control then again returns to block 304, thus forming an interval loop. The interval timer variable, interval mileage variable and interval fuel consumption value are updated based on the change in time, mileage and fuel consumption since the last iteration of the interval loop, thus resulting in a record of the cumulative amount of time and mileage in the current interval. In the most preferred embodiment of the present invention, cumulative totals for these variables are stored as well as a running history for each iteration of the interval loop. Also, during each pass through the interval loop, the current fuel consumption rate or fuel consumption quantity, as provided by ECM 19, is recorded.

Fundamentally, the interval loop acts to limit the iterations of steps used to determine the quantity of oil to be injected into the fuel system of the internal combustion engine. That is, due to the relatively small rate of injection of oil to the fuel system, it is only necessary to calculate the oil injection quantity on a periodic basis, approximately every minute. Thus, in the most preferred embodiment, the interval loop is structured so that the preset interval will be reached by the internal selection variable approximately every minute.

Also, the interval loop functions to determine and record the fuel consumption rate or fuel consumption amount for the current interval. Each time control passes to block 306, a fuel consumption value is determined. The fuel consumption value is preferably the instantaneous fuel consumption rate provided directly by ECM 19, as discussed hereinabove. Alternatively, if the engine is not provided with an ECM the instantaneous fuel consumption rate may be calculated, and then recorded, using engine speed and fuel rail pressure information received from the engine speed and pressure sensors discussed hereinabove. During each interval, the instantaneous fuel consumption values are averaged to obtain an average fuel consumption rate, or fuel consumption quantity, as applicable, for the interval. It should be understood that a fuel consumption value corresponding to the amount of fuel burned may be provided instead of a fuel consumption rate value. Preferably, an average fuel consumption rate is continuously calculated as each instantaneous fuel consumption rate is determined during the current interval.

Figure 4:
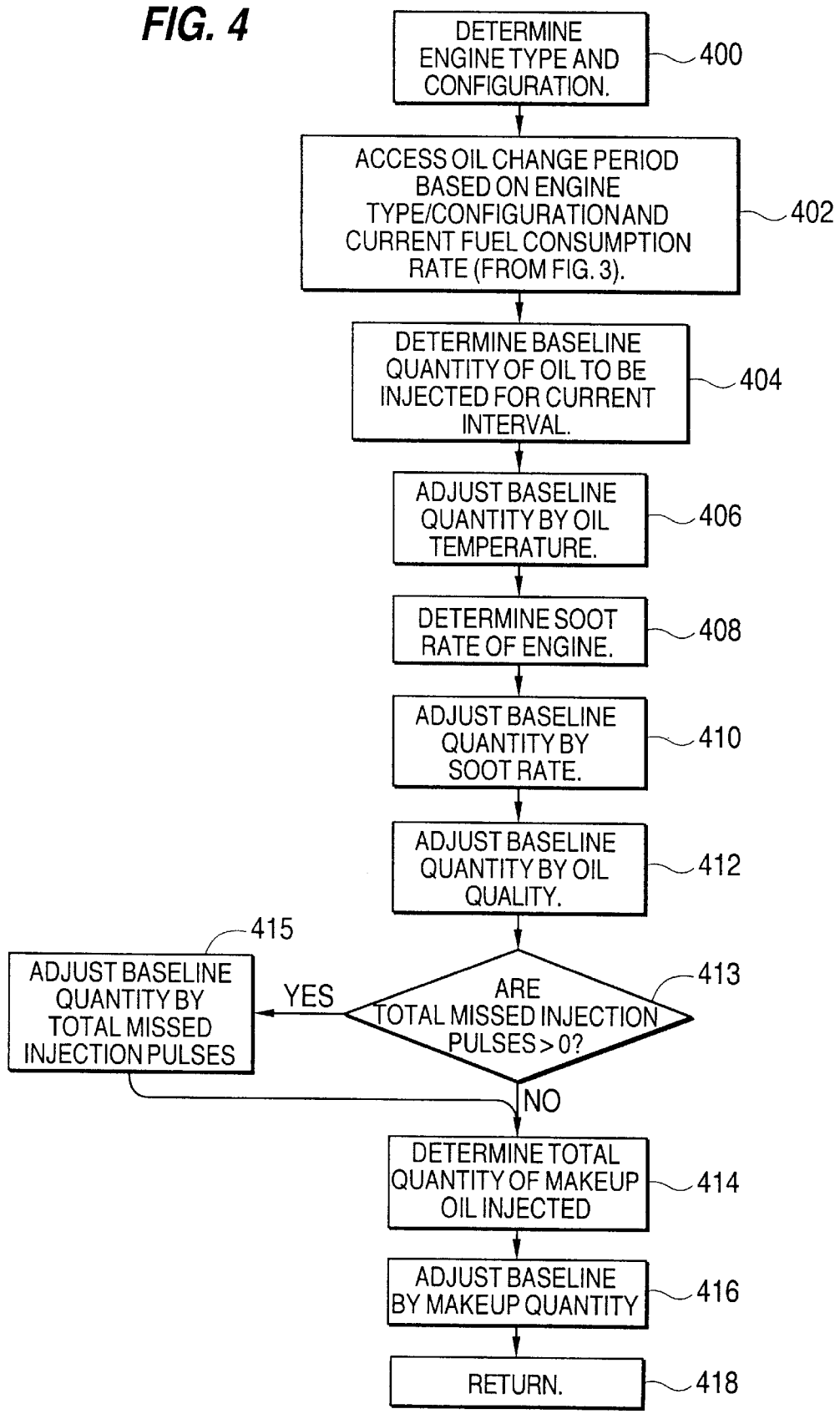
FIG. 4 is a flowchart illustrating in more detail the step of determining the oil quantity to be injected as shown in FIG. 3.
Figure 5:
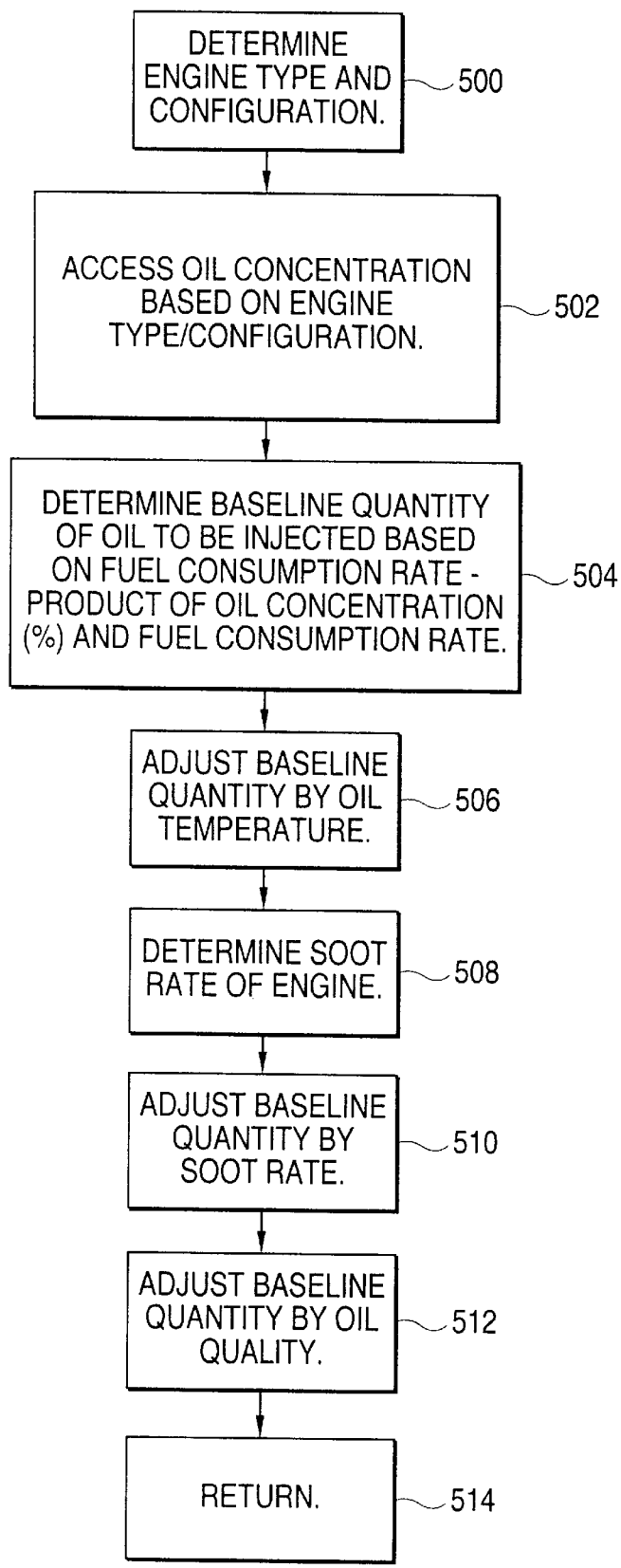
FIG. 5 is a flowchart illustrating an alternative method for calculating the quantity of oil to be injected for a particular interval.

Once the interval selection variable reaches the preset interval, control passes to block 310. In block 310, the system determines the quantity of oil to be injected into the fuel system during the current interval based on the fuel consumption value, i.e. fuel consumption rate. Importantly, the fuel consumption value is directly related to the operating severity of the internal combustion engine which determines the oil replacement needs of the engine. As indicated in block 310, this process of determining the quantity of oil to be injected during the current interval is discussed in more detail below in connection with the flowcharts shown in FIGS. 4 and 5. FIG. 4 illustrates the preferred process of determining the quantity of oil to be injected based on the current fuel consumption while FIG. 5 illustrates an alternative embodiment. Once the current amount of oil to be injected is determined, this current amount of oil is added to the total amount of oil to be injected from previous interval periods, if any, to result in a cumulated oil quantity to be injected. That is, the amount of oil to be injected for a certain number of interval periods is summed to form a cumulated oil quantity to be injected. As noted below, once this cumulated oil quantity exceeds a predetermined threshold, an injection event is initiated and the cumulated oil quantity reset.

More specifically, once the amount of oil to be injected is determined and added to the cumulated oil quantity, control passes to decisional block 312, where it is determined if the cumulated oil quantity to be injected exceeds a unit injection quantity. That is, in the most preferred embodiment as discussed above, lube oil injection control device 16, shown in FIG. 1, is configured to inject a constant amount of oil (the unit injection quantity or one injection unit) into the fuel system of the internal combustion engine upon each actuation thereof. Thus, only when the cumulated oil quantity exceeds the unit injection quantity is it necessary to initiate an injection event. Otherwise, by increasing the cumulated oil quantity by the amount of oil to be injected in the current interval, injection is deferred until such future intervals when the cumulated oil quantity exceeds the unit injection quantity.

Thus, referring back to FIG. 3, if the cumulated oil quantity does not exceed the unit injection quantity, control passes to block 314 where the cumulated oil quantity is recorded for later use. Control then passes to block 316, where the interval timer variable, interval mileage variable, and interval fuel consumption value, are reset to zero in preparation for the next interval loop, and finally control returns to block 304, where the system again enters the interval loop.

If the cumulated oil quantity exceeds the unit injection quantity in block 312, then control passes to block 313 where it is determined whether the engine is operating within one or more predetermined engine or system parameters. This control scheme ensures that an injection event will only be initiated if the engine is operating within predetermined parameters. For example, the inquiry may be whether the lube oil pressure is greater than a predetermined level, such as 20 psi, to permit an oil pressure actuated injection pump to be effectively operated. The inquiry may include whether the oil temperature is greater than a predetermined level, such as 125 degrees F., to ensure proper oil viscosity for effective oil flow and pump operation. Of course, other engine or system operating parameters, such as makeup oil temperature, may be used alone or in any combination. If one or more of the parameters are not met, then control transfers to block 315 wherein the need for a single injection event is recorded as, for example, a missed injection pulse and added to any previous missed injection pulses to form a total missed injection pulse. From block 315, control transfers to block 320 to reset the cumulated oil quantity to zero as discussed more fully hereinbelow. If the operating parameters are met, then control transfers to block 318 for initiating an injection event. Specifically, in block 318, a solenoid control signal is generated by the oil replacement controller 18 and supplied to lube oil injection control device 16 (shown in FIG. 1) to initiate the injection of one injection unit of oil, for example, one ounce.

Control then passes to block 320, where the cumulated oil quantity is reset to zero. That is, in view of the injection event occurring in block 318 as a result of the cumulated oil quantity exceeding the unit injection quantity, the cumulated oil quantity is reset to zero to allow for the quantity of oil to be injected in future intervals to be similarly accumulated. Of course, one of skill in the art will appreciate that the cumulated oil quantity could be reduced only by the unit injection quantity (instead of being reset to zero) to provide for greater accuracy in the oil replacement system of the present invention, if necessary. Control then passes to block 316, where the interval timer variable, interval mileage variable, and interval fuel consumption value, are reset to zero, and finally control returns to block 304, where the system again enters the predetermined interval loop.

As noted above, the determination of the quantity of oil to be injected into the fuel system during any given time interval is determined based on the fuel consumption of the internal combustion engine. As the operating conditions of the engine vary, the fuel consumption rate of the engine varies resulting in variations in the quantity of oil to be injected. As the quantity of oil to be injected varies, the timing of oil injection and thus the injection flow rate varies since the time required to produce a unit injection quantity will vary. The process employed in the most preferred embodiment of the present invention to calculate the quantity of oil is illustrated in FIG. 4.

As discussed hereinbelow, the most preferred embodiment of the present invention uses a fuel consumption value as an indication of the engine operating severity since fuel consumption closely correlates to the operating severity of the engine and thus the deterioration of the lube oil. However, other engine operating parameters which correlate to the severity of engine operation may be used, such as engine exhaust air temperature. The engine operating severity value, i.e. preferably an average or total, depending on the parameter, as opposed to an instantaneous value, would be calculated for a current interval of engine operation and used in the process of the present invention in a similar manner as the fuel consumption value. Of course, the correlation of the engine operating severity value to the severity of engine operation and the determination of the oil to be injected would be dependent on the particular severity value used as discussed hereinbelow.

As seen in FIG. 4, the process begins in block 400 where the system determines the internal combustion engine type and configuration based on initial set-up information provided to the oil replacement controller 18. Initial set-up information for a plurality of internal combustion engine types and configurations could be stored, for example, in memory 216 discussed above in connection with FIG. 2 and could be selected based on a DIP switch or jumper connection on the oil replacement controller 18, such as through the use of engine type selection switches 232. Alternatively, the internal combustion engine type and configuration information could itself be provided by an external DIP switch, jumper block, or the like.

The configuration information could include, for example, the specific fuel system in use on the internal combustion engine and any other suitable information impacting the fuel consumption of the engine. For each combination of engine type and configuration information, the system includes a data table of oil change periods corresponding to respective fuel consumption values of the internal combustion engine.

Control then transfers to block 402, where the fuel consumption value of the internal combustion engine is used as an index to the data table corresponding to the engine type and configuration information, to thus access an oil change period corresponding to the current operational state of the internal combustion engine. Thus, for any given fuel consumption value as determined for the current interval, a current oil change period for the type and configuration of the engine is determined. Control then passes to block 404 where the current oil change period is divided into the oil capacity of the internal combustion engine to determine a baseline quantity of oil to be injected into the fuel system of the internal combustion engine.

For example, for an engine currently having a fuel consumption value of 7 miles-per-gallon, an oil change period of 25,000 miles is determined from the appropriate data table in block 402. If the engine has an oil sump capacity of 11 gallons, then the baseline quantity of oil to be injected is equal to 11 gallons divided by 25,000 miles, or approximately 0.06 ounces-per-mile. If, however, the same engine is operating at a fuel consumption value of 5 miles-per-gallon, the oil change period is determined in block 402 to be 12,000 miles. Thus, the baseline quantity of oil to be injected is equal to 11 gallons divided by 12,000 miles, or approximately 0.12 ounces-per-mile.

As discussed hereinabove, an alternative embodiment may use an engine operating severity value other than fuel consumption, such as engine exhaust air temperature and lube oil soot contamination levels. In this case, the oil change period would be accessed in block 402 using a specific data table correlating the particular engine operating severity value to the oil change period.

Control next transfers to block 406, where the baseline quantity is adjusted by the oil temperature. In the most preferred embodiment, if the oil temperature is over 255° F., the baseline quantity will be increased by as much as 50%, generally in proportional relationship to the amount by which the oil temperature exceeds 255° F.

In blocks 408 and 410, the system next adjusts the baseline quantity based on the soot producing characteristics of the internal combustion engine operating at the specific fuel consumption value. Thus, in block 408, the system first reads a soot data table to determine the soot rate of the engine for the current interval fuel consumption value and fuel quality. This value is used in block 410 to adjust the baseline quantity of oil to be injected such that a higher soot rate results in an increase in the baseline quantity of oil to be injected, while a lower soot rate results in a decrease in the baseline quantity of oil to be injected.

In accordance with the most preferred embodiment of the present invention, the baseline quantity of oil to be injected can optionally be further adjusted in accordance with a number of factors, if desired. Specifically, in block 412 for example, the baseline quantity can be adjusted based on the quality of the oil used in the internal combustion engine. Thus, if the engine is using a higher quality oil having a longer life span, then the amount of oil to be disposed through injection into the fuel could be reduced. Conversely, if a lower grade oil is used, the amount to be injected could be increased accordingly. Also, although not shown in FIG. 4, adjustments could be made to the baseline quantity based on the sulfur content of the fuel.

Also, in the preferred embodiment, the baseline quantity of oil is adjusted based on the total missed injection pulses calculated in block 315 in FIG. 3 to compensate for the missed injections thereby maintaining the quality of the oil in the engine at the optimal level. Therefore, control from block 412 is transferred to block 413 where it is determined whether the total missed injection pulses is greater than zero. If the answer is yes, then control transfers to block 415 where the baseline quantity of oil is adjusted based on the total missed injection pulse count. Of course, if the total missed injection pulses in greater than zero, the baseline quantity of oil is increased to remove more oil from the engine, i.e. increase the rate of removal by causing the injection pump to cycle earlier. The total of the missed injection pulses would then be reset accordingly. If the total missed injection pulses is not greater than zero, then control transfers to block 414.

Figure 6:
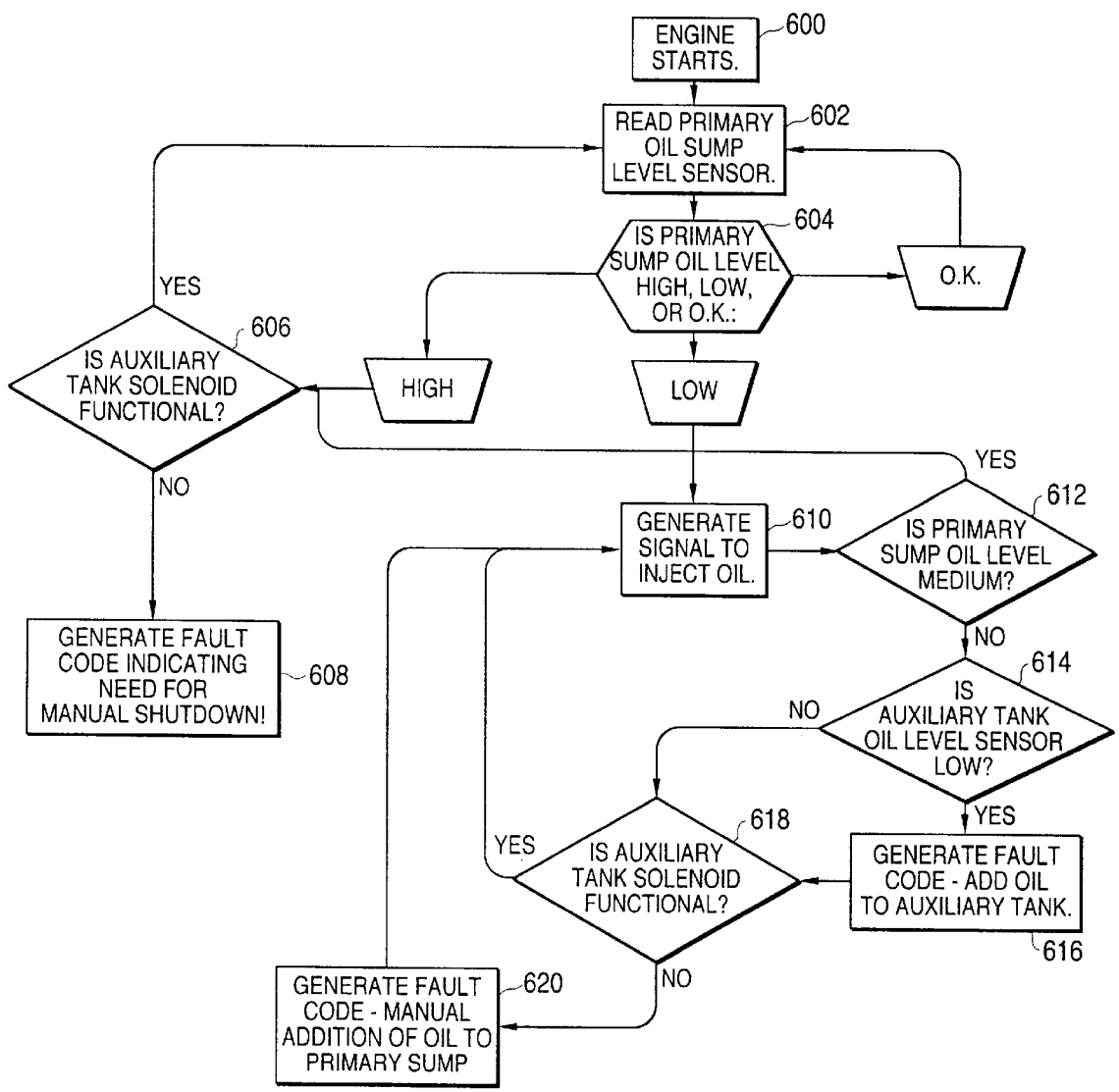
FIG. 6 is a flowchart illustrating a diagnostic process for monitoring the amount of available oil in a lube sump, for replacing such amount from an auxiliary oil tank when necessary and for providing external indications of the condition of the oil replacement system to an operator of a vehicle.

In addition, in the preferred embodiment, the baseline quantity of oil is adjusted based on a quantity of makeup oil supplied to the engine's lube oil system by auxiliary lube oil supply system 22 between injection events. A given injection event will include the removal of used oil from the engine lube oil system, the injection of the used oil into the fuel system and the replacement or injection of a quantity of fresh oil into the engine lube oil system to replace the removed quantity. Importantly, the auxiliary lube oil supply flow control can also be controlled between injection events to inject a makeup quantity of fresh oil to the engine to replace oil consumed by the engine, i.e. oil leaking from the lube oil system through seals/gaskets or gradual oil burning in the engine cylinders. The diagnostic system discussed hereinbelow and shown in FIG. 6 illustrates one method of determining the quantity of makeup oil to be injected into the engine lube oil system based on the lube oil level in the sump 24. Regardless of the diagnostic system or method used to determine the need for fresh makeup oil, the quantity of makeup oil functions not only to increase the quantity of oil in the engine lube oil system, but also to increase the quality of the oil. Accordingly, the addition of makeup oil to the engine sump necessarily reduces the need to replace the oil in the lube oil system, i.e. reduces the quantity of oil needing replacement, to maintain the lube oil at a predetermined quality.

The system and method of the present invention as shown in FIG. 4 adjusts the quantity of used oil to be removed based on the quantity of fresh makeup oil supplied between injection events thereby preventing overreplacement of the lube oil in the engine. Specifically, in block 414 for example, the quantity of makeup oil injected in the lube oil system, since the previous injection event of used oil into the fuel system, is determined or calculated. This quantity may be in the form of a total makeup quantity value based on, for example, the number of makeup injections performed by the auxiliary flow control device 44. This total makeup quantity value may then be used to adjust the baseline quantity of oil to be injected as shown in block 416. If a makeup quantity of fresh oil is added to the sump since the last used oil injection, the baseline quantity of oil to be removed is decreased by a predetermined amount. The greater the quantity of makeup oil injected, the greater the downward adjustment in the baseline quantity of used oil to be removed from the lube oil system and injected into the fuel system. Of course, if no makeup injections have taken place, then the baseline quantity of used oil to be removed is not adjusted. Upon completion of the process illustrated in FIG. 4, control returns at block 418 to block 312 shown in FIG. 3.

A second embodiment of the process for calculating the quantity of oil to be injected for a particular interval is illustrated in FIG. 5. In this embodiment, the quantity oil to be injected is based on a desired oil concentration value. The oil concentration value which may vary depending on the engine type and configuration. The process begins in block 500 where the system determines the internal combustion engine type and configuration based on initial set-up information provided to the oil replacement controller 18. As with the previous embodiment of FIG. 4, initial set-up information for a plurality of internal combustion engine types and configurations could be stored, for example, in memory 216 discussed above in connection with FIG. 2 and could be selected based on a DIP switch or jumper connection on the oil replacement controller 18, such as through the use of engine type selection switches 232. Alternatively, the internal combustion engine type and configuration information could itself be provided by an external DIP switch, jumper block, or the like. The configuration information could include, for example, the specific fuel system in use on the internal combustion engine and any other suitable information impacting the fuel consumption of the engine.

Control then transfers to block 502, where the specific engine type and configuration of the internal combustion engine is used as an index to a data table to access an oil concentration value. Control then passes to block 504 where the oil concentration value is multiplied by the current fuel consumption value or rate of the internal combustion engine to determine a baseline quantity of oil to be injected into the fuel system of the internal combustion engine. For example, for a given engine type and configuration, an oil concentration value of 0.03% may be accessed in block 502 and multiplied by the current fuel consumption value of, for example, 7 miles-per-gallon to obtain the current baseline quantity of oil to be injected.

Control next transfers sequentially to blocks 506, 508, 510 and 512 where the baseline quantity is adjusted based on the oil temperature, the soot producing rate of the fuel and the quality of the lube oil, as discussed with respect to the preferred embodiment of FIG. 4. Of course, this process may also include the step of adjusting the baseline quantity based on the quantity of makeup oil to prevent overreplacement of the oil. Upon completion of the process illustrated in FIG. 5, control returns at block 514 to block 312 shown in FIG. 3.

Referring next to FIG. 6, a second important aspect of the present invention in which a diagnostic process is performed to monitor the oil sump level, to transfer oil from auxiliary oil tank 40 to primary oil sump 24 if necessary, and to alert an operator to a fault condition in the oil replacement system of the present invention will now be discussed in detail. As seen in FIG. 6, the most preferred embodiment of the diagnostic process begins at block 600 when an internal combustion engine containing an oil replacement system in accordance with the present invention is started. Upon starting of the internal combustion engine, the controller 18 containing the diagnostic process will be initialized and the control program contained therein executed, beginning in block 602.

In block 602, the diagnostic process first reads the oil sump level sensor to determine the oil level in primary oil sump 24. Having determined this level, the process transfers control to decisional block 604, where the process determines if the primary oil sump level is either high or low. If the oil level is neither high nor low, control returns to block 602 to form an oil sump level monitoring loop.

If it is determined in decisional block 604 that the oil level is high, control transfers to decisional block 606, where it is determined if the solenoid associated with auxiliary oil flow control device 44 is functional. That is, as described above in connection with FIG. 1, the solenoid of auxiliary oil flow control device 44 can be actuated to allow oil from auxiliary oil tank 40 to be supplied to primary oil sump 24. However, should the solenoid of device 44 be defective or stuck in an open condition, it could result in overfilling of the primary oil sump 24. Therefore, in accordance with the most preferred embodiment of the diagnostic process shown in FIG. 6, if the primary oil sump level is high, the diagnostic process verifies proper operation of the solenoid associated with control device 44 to ensure that the excess oil in primary oil sump 24 is not the result of the solenoid of control device 44 being defective.

If it is determined that the solenoid of auxiliary oil flow control device 44 is not functional, then control transfers to block 608 where a fault code is generated to the vehicle operator indicating that the solenoid/control device 44 may be malfunctioning and that a manual shutdown procedure may be necessary. If it is determined that control device 44 is functioning properly, then control returns to block 602 to continue monitoring the oil level in primary oil sump 24.

If in decisional block 604 it is determined that the oil level in the primary oil sump is low, control transfers to block 610, where the diagnostic system generates a signal commanding oil injection from the auxiliary oil tank to primary oil sump 24. That is, as a result of the determination that the primary oil sump level is low, the diagnostic system adds oil from auxiliary tank 40 to primary sump 24.

Control then transfers to decisional block 612, where the process determines if the primary oil sump level is medium. If the oil level is medium, then the oil addition performed in block 610 was sufficient to replenish primary oil sump 24 and control transfers to block 606 to verify that the solenoid of auxiliary oil control device 44 is functioning properly. If the oil level is not medium, then the oil addition performed in block 610 was insufficient to replenish the primary oil sump, and control transfers to decisional block 614.

In decisional block 614, the diagnostic process determines if the auxiliary oil tank level sensor is low. That is, the diagnostic process reads an auxiliary oil tank level sensor and processes the resulting level information to determine if sufficient oil remains in auxiliary oil tank 40. If auxiliary tank 40 does not contain a sufficient amount of oil (i.e. the level is low), then control transfers to block 616 where a fault code is generated alerting the operator of the need to add oil to auxiliary oil tank 40. Control then returns to decisional block 618 discussed hereinbelow. If it is determined in decisional block 614 that the auxiliary oil tank level is not low, the control transfers directly to decisional block 618.

In decisional block 618, the diagnostic process determines if the solenoid of auxiliary flow control device 44 is functional. That is, the diagnostic process makes a similar determination as that made in decisional block 606. In block 618, however, if it is determined that the solenoid is functional, then control returns to block 610, where additional oil is transferred from auxiliary oil tank 40 to primary oil sump 24. This process continues until the primary oil sump level has been adequately replenished.

If, however, it is determined in decisional block 618 that the solenoid of control device 44 is not functional, then control transfers to block 620 where a fault code indicating that oil should be manually added to primary oil sump 24 is generated to the operator of the vehicle. Control then returns to block 610 to continue attempts at transferring oil from auxiliary oil tank 40 to the primary oil sump 24.

Having described the most preferred embodiment of the diagnostic process of the present invention above in detail, it should be appreciated that various alterations to this system could be made within the scope of the invention. Specifically, if the primary oil sump level sensor only has a "low" output, then the diagnostic process of FIG. 6 could be simplified such that as a result of the low level signal, oil is transferred from auxiliary tank 40 to the primary oil sump 24. Furthermore, it is possible that the vehicle would not be equipped with auxiliary oil tank 40, it which case it would not be possible to replenish oil to primary oil sump 24. In this case, the diagnostic process would merely generate an appropriate dashboard indicator to the vehicle operator indicating the need for oil addition, etc. Finally, the diagnostic process of the present invention will also record the amount of oil being transferred from auxiliary tank 40 to the primary oil sump 24 and compare this value at regular intervals with the fuel consumption value and/or the amount of oil injected into the fuel system of the engine. By making this comparison, the diagnostic process can determine if the replacement rate is higher or lower than the injection rate to detect an oil pan leak or other malfunctioning.

The present lube oil replacement system results in several important advantages. First, the present system maintains the quality of the lube oil in sump 24 at an optimum level throughout engine operation regardless of engine operating conditions. Fundamentally, the present system is capable of automatically and continuously determining the current level of distress or wear imparted upon the oil based on varying engine operating conditions and continuously adjusting the replacement rate to obtain an optimum level of engine lubrication throughout engine operation. This is accomplished by variably controlling the amount of oil drained from the sump and injected into the fuel system based on the severity of engine operation as indicated by, for example, fuel consumption of the engine, and other factors such as engine temperature and oil soot contamination levels. Generally, when the engine operates at above normal capacity and increased load, the fuel consumption rate increases and the rate of oil degradation increases. In response, the present system will increase the frequency of used lube oil injections into the fuel system and accordingly increase the frequency of new lube oil injections from auxiliary tank 40 into sump 24. On the other hand, if the engine begins to operate at a reduced capacity under lighter loads, fuel consumption will decrease resulting in less than normal oil degradation. In response, the present system will decrease the frequency of used lube oil injections into the fuel system and accordingly decrease the frequency of new lube oil injections from auxiliary tank 40 into sump 24. The present system variable controls the frequency of lube oil replacement by controlling the frequency of operation of injection control device 16 and auxiliary lube oil flow control device 44. In comparison, most conventional "preset" continuous lube oil replacement systems do not adequately maintain the quality of the lube oil in the sump. A conventional "preset" continuous lube oil replacement system injects predetermined quantities of lube oil at preset time intervals throughout engine operation. The injection quantity or the frequency of injections is adjustably set to cause replacement of the entire sump according to the regular recommended oil change period for the particular engine regardless of engine operating conditions. If the engine is operated at greater than normal capacity, the conventional system will continue to inject the same quantity of oil over time. As a result, over time, the lube oil will periodically reach levels of high degradation causing increased engine wear. This comparative advantage of the present invention over conventional "preset" systems is shown by Example I and Table I.

EXAMPLE I

Each engine is an M11 engine, manufactured by the assignee of the present invention, Cummins Engine Co., Inc., having a 100 gallon fuel tank and an 11 gallon oil sump. The engine pumps 40 gallons per hour of fuel through the fuel system continuously. When operating at full power, this engine will burn approximately 16 gallons per hour with the remaining returning to the fuel tank. When operating at nearly no load, the engine will burn 4 gallons of fuel per hour. The fuel is a low sulfur fuel with 0.045% sulfur and the lubricant contains 0.45% sulfur.

Engine A includes a conventional "preset" injection system with a preset injection rate of lube oil into the fuel system based on no load conditions. Engine B includes the present continuous lube oil replacement system. The engines are operated at full power, i.e. under full load conditions, for the recommended oil change period of 12,000 miles for full power operation. As shown in Table I, the conventional system in engine A fails to respond to the need for increased oil replacement under the heavier operating conditions of the engine by only replacing 2.7 gallons under full power conditions. As a result, the lube oil in the engine's lube oil system becomes over-used causing increased engine wear. The present system, on the other hand, replaces 11.4 gallons of oil thus providing optimal engine protection.

TABLE I

|  | Oil replaced in 12,000 miles (gallons) | Oil concentration in fuel (%) | Fuel sulfur content including used oil (%) |
| --- | --- | --- | --- |
| Engine A - Conventional "preset" system | 2.70 | 0.2 | 0.045 |
| Engine B - Present system | 11.4 | 0.8 | 0.047 |

Also, by frequently adjusting the rate of oil replacement to inject only the required amount of oil according to engine fuel consumption, the present system avoids wasting oil. Conventional "preset" lube oil replacement systems, which are preset to inject oil at a rate corresponding to normal or high engine operating capacity, will continue to inject more oil than necessary resulting in unnecessary costs to the operator. Example II and Table II set forth this comparative advantage of the present invention over conventional "preset" systems.

EXAMPLE II

The type of engine, fuel and lubricant is the same as described in Example I hereinabove. Also, engine A includes a conventional "preset" injection system while engine B includes the present continuous lube oil replacement system. However, engine A is now preset with a lube oil injection rate based on full engine power operation and the engines are operated at no load. Since the oil change recommendation at full power is 11 gallons every 12,000 miles, the oil change recommendation at no load will be significantly less the 11 gallons every 12,000 miles. However, as shown in Table II, the amount of oil replaced in engine A at 12,000 miles even exceeds the full power recommendation. Thus, it is shown that the conventional "preset" system unnecessarily injects, and therefore wastes, approximately 14 gallons of oil. The present system, on the other hand, automatically compensates for the decreased load by injecting less oil into the fuel system.

TABLE II

|  | Oil replaced in 12,000 miles (gallons) | Oil concentration in fuel (%) | Fuel sulfur content including used oil (%) |
| --- | --- | --- | --- |
| Engine A - Conventional "preset" system | 20.3 | 1.70 | 0.052 |
| Engine B - Present system | 6.24 | 0.56 | 0.047 |

Another advantage of the present invention is the ability to maintain the lube oil concentration in the fuel below a level necessary to maintain the sulfur content of the fuel below the acceptable limit of 0.05%. It has been found that, for the typical oil, the lube oil concentration in the fuel should be less than 1% at all times during engine operation and preferably approximately 0.5% to maintain the sulfur content of a typical low sulfur fuel below 0.05%. Conventional systems are less capable of maintaining the sulfur content below 0.05% since at certain engine operating conditions more oil will be injected into the fuel system than is necessary. The likelihood of conventional systems resulting in unacceptably high sulfur levels in the fuel is especially high when the engine is operating at a capacity less than the capacity corresponding to the preset injection rate. As shown in Example II and Table II, the conventional "preset" system may inject an excessive amount of lube oil into the fuel causing the cumulative sulfur content of the oil and fuel to exceed the acceptable limit of 0.05%. Excessive oil concentrations may also adversely affect the engine emissions resulting in emissions noncompliance. The present system maintains the sulfur concentration within acceptable limits by varying the injection rate based on engine conditions and is also more likely to maintain emissions within regulatory limits throughout operation of the engine. As shown in Table I, although the present system injects more oil to provide optimal engine protection at higher engine loads, the fuel sulfur content and oil concentration are maintained within acceptable limits.

Referring now to FIGS. 7–10, the present invention is also directed to an improved electronically controllable lube oil pump system indicated generally at 700, which integrates the control of injection control device 16 and auxiliary flow control device 44. FIGS. 7–10 illustrate in general schematic form the major components and functional modes of lube oil system 700 while a specific embodiment will be discussed hereinbelow with respect to FIGS. 11–14. Lube oil pump system 700 generally includes an injection pump 702 for removing used oil from the engine lube oil system and injecting the removed oil into an engine fuel system, an auxiliary lube oil pump 704, an injection control valve 706 and an auxiliary control valve 708. Auxiliary lube oil pump 704 may be operated in a replacement mode, as discussed hereinbelow, for supplying fresh oil to the engine lube oil system to replace the oil removed by injection pump 702, and also in a makeup mode for supplying makeup oil to the engine lube oil system to compensate for oil consumed by the engine in a normal manner, such as by leakage from the engine and/or gradual oil burning in the engine cylinders.

Injection pump 702 includes an injection piston 710 reciprocally mounted in an injection piston bore 712 for movement through a removal stroke for removing used oil from the lube oil system and an injection stroke for injecting the removed oil into the fuel system associated with the engine. An injection actuation chamber 714 is positioned in bore 712 adjacent one end of the injection piston 710 while an injection removal chamber 716 is formed in bore 712 on an opposite side of the injection piston 710 for receiving removed oil to be injected into the fuel system. Auxiliary lube oil pump 704 includes an auxiliary lube oil piston 718 reciprocally mounted in an auxiliary piston bore 720 for reciprocal movement through a suction stroke for accumulating a quantity of fresh oil and a discharge stroke for discharging the quantity of fresh oil to the engine's lube oil system thereby replacing oil removed by injection pump 702 or making up oil consumed by the engine during the makeup mode of operation. An auxiliary actuation chamber 722 is formed in auxiliary piston bore 720 adjacent one end of auxiliary piston 718 for receiving actuating fluid for moving piston 718 through the discharge stroke. Also, an auxiliary discharge chamber 724 is positioned on an opposite side of the auxiliary piston 718 from auxiliary actuation chamber 722 for receiving fresh oil to be injected into the engine lube oil system during both the replacement and makeup modes of operation.

Figure 7:
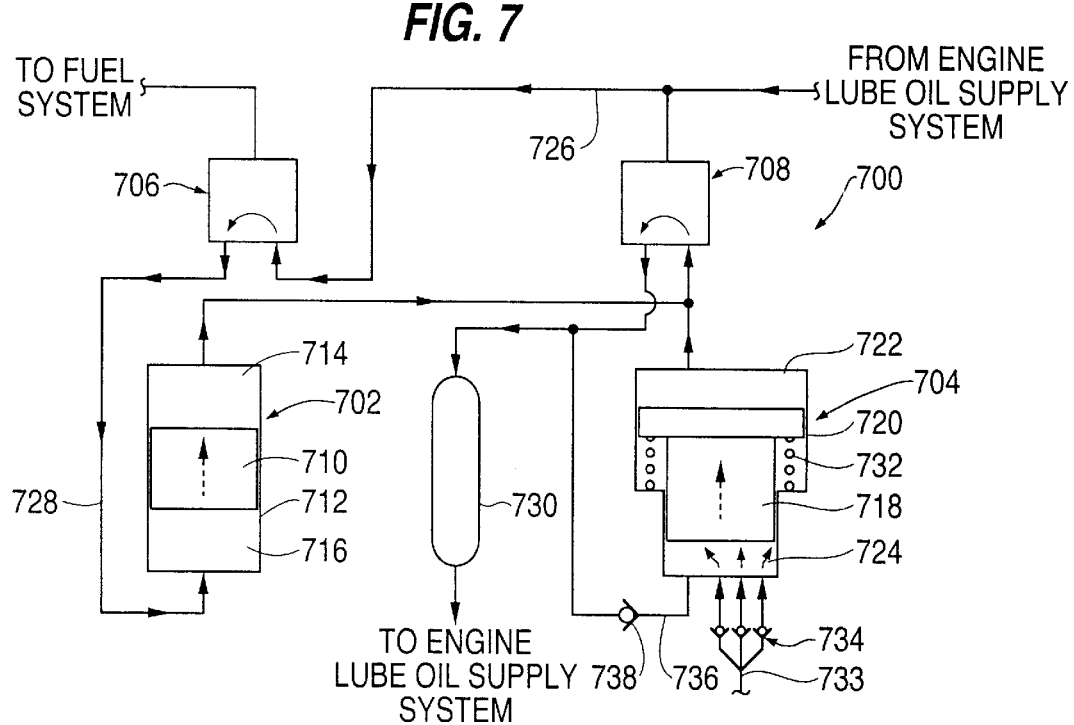
FIG. 7 is a diagrammatic view illustrating the lube oil flow circuitry and the various components of the lube oil replacement pump system of the present invention with the injection pump removing used lube oil from the lube oil system and the auxiliary pump advancing through a suction stroke.
Figure 8:
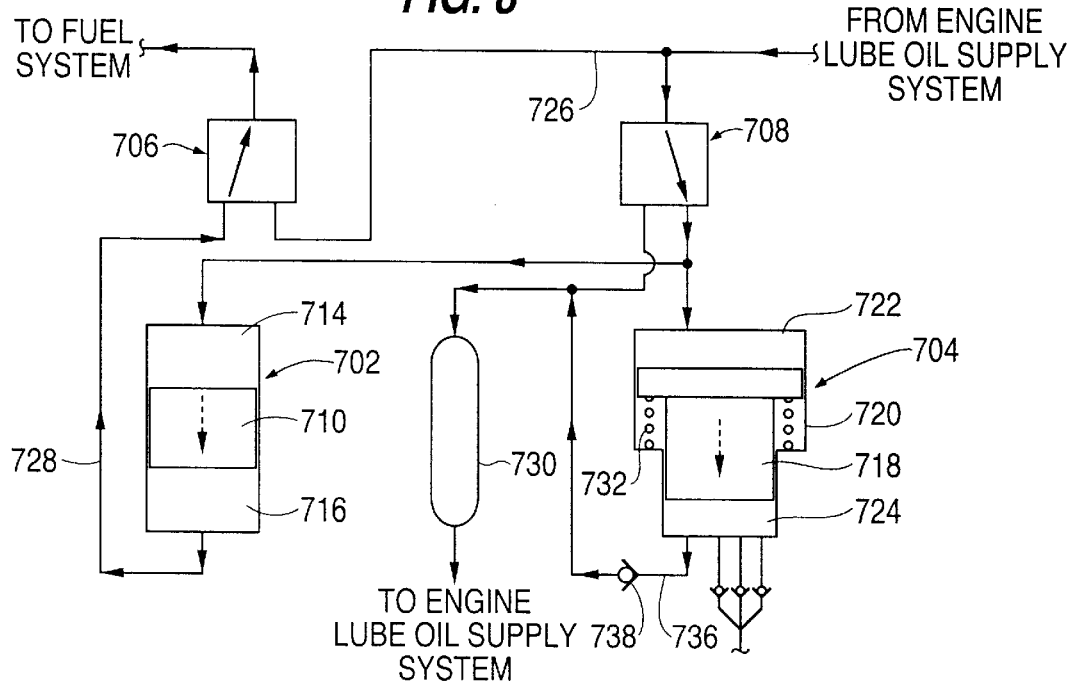
FIG. 8 is a view similar to FIG. 7, but with the injection and auxiliary pump injecting used and fresh oil, respectively.

Injection control valve 706 and auxiliary control valve 708 are electronically operated by controller 18 (FIG. 1) to control the operation of injection pump 702 and auxiliary lube oil pump 704 and thus the quantity of used oil removed from the engine and injected into the fuel system and the quantity of replacement and makeup oil supplied to the engine lube oil system, respectively. Injection control valve 706 and auxiliary control valve 708 are preferably three-way, two-position solenoid operated valves capable of quickly and effectively controlling the flow of lube oil through system 700. The operation of system 700 will now be described with reference to FIGS. 7–10. Referring to FIG. 7, injection control valve 706 is energized to connect a passage 726 connected to the engine lube oil system, to a removal passage 728 thereby permitting lube oil from the engine lube oil system to flow through injection control valve 706 into injection removal chamber 716. Simultaneously, auxiliary control valve 708 is energized to connect injection actuation chamber 714 and auxiliary actuation chamber 722 to a common drain passage 730. In this position, injection control valve 706 blocks the flow of lube oil to the engine fuel system while auxiliary control valve 708 blocks the flow of lube oil from the engine through auxiliary control valve 708. The pressurized lube oil from the engine entering injection removal chamber 716 moves injection piston 710 through the removal stroke toward injection actuation chamber 714 thereby forcing lube oil in chamber 714 through passages and auxiliary control valve 708 into common drain passage 730 for delivery to the engine lube oil supply system. Lube oil in auxiliary actuation chamber 722, on the other hand, is forced out of chamber 722 by the biasing force of a coil spring 732 mounted in auxiliary piston bore 720. Biasing spring 732 is designed with sufficient biasing force to produce a suction pressure in auxiliary discharge chamber 724 sufficient to draw lube oil into chamber 724. Preferably, biasing spring 732 is designed to pull oil from an auxiliary lube tank located between two feet below the inlet level of the chamber and 28 feet above the inlet level. The flow of fresh oil flows through a delivery passage 733 and three check valves 734 directly into auxiliary discharge chamber 724. The fresh oil in auxiliary discharge chamber 724 is prevented from exiting through a discharge passage 736 by a high pressure check valve 738. Thus, as shown in FIG. 7, system 700 is operated so that injection pump 702 takes in a full charge of used oil from the engine lube oil system into injection removal chamber 716 while auxiliary lube oil pump 704 takes in a charge of fresh oil into auxiliary discharge chamber 724. After a predetermined period of time, injection control valve 706 and auxiliary control valve 708 are controlled, i.e. de-energized, to deliver actuating lube oil to the respective actuation chambers while causing the removed used oil to be injected into the fuel system and the fresh oil to be injected into the engine lube oil supply system. Specifically, as shown in FIG. 8, injection control valve 706 is de-energized to block the flow of supply lube oil through valve 706 while connecting removal passage 728 to the engine fuel system. Simultaneously, auxiliary control valve 708 is de-energized to block the drain passage connected to valve 708 while connecting the lube oil supply to passages leading to auxiliary actuation chamber 722 and injection actuation chamber 714. Thus, pressurized lube oil from the engine lube oil supply system is delivered to the actuation chambers 714, 722 forcing injection piston 710 and auxiliary lube oil piston 718 through the injection and discharge strokes, respectively. As injection piston 710 moves toward injection removal chamber 716, the used oil previously removed from the engine lube oil supply system is injected into the engine fuel system. Simultaneously, auxiliary lube oil piston 718 moves toward auxiliary discharge chamber 724 pressurizing the fresh oil in chamber 724 and delivering the fresh oil through discharge passage 736 and high pressure check valve 738 to the engine lube oil supply system via common drain passage 730.

Figure 9:
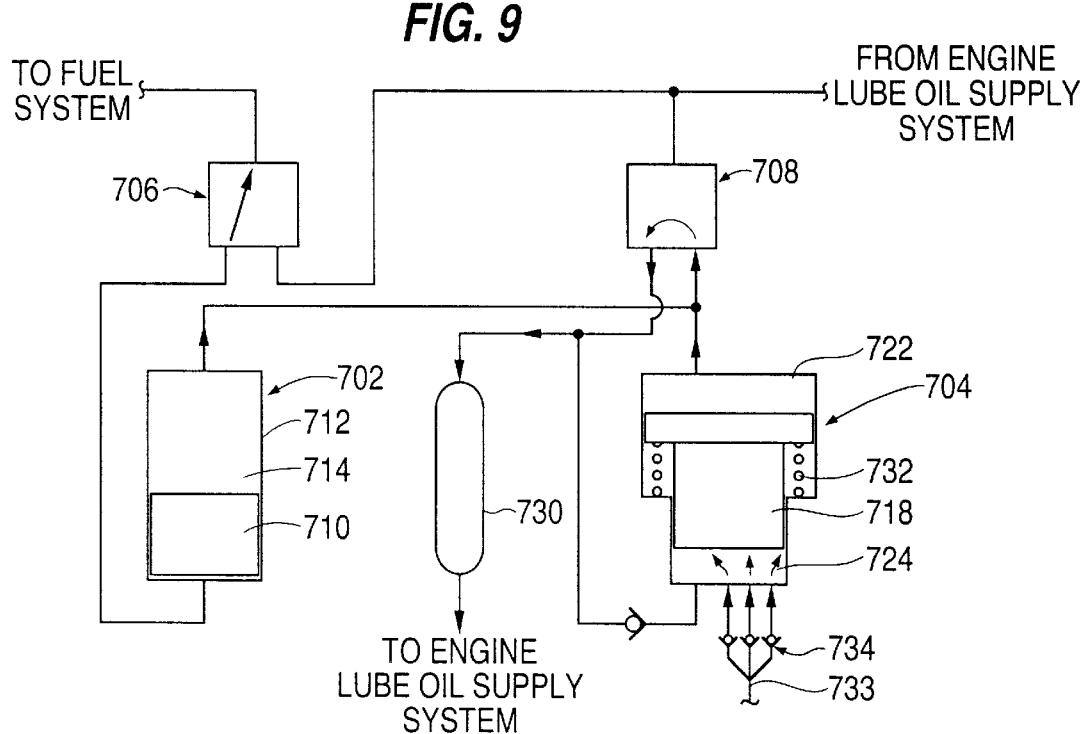
FIG. 9 is a view of the system in the replacement or makeup mode with the auxiliary pump piston moving through a suction stroke.
Figure 10:
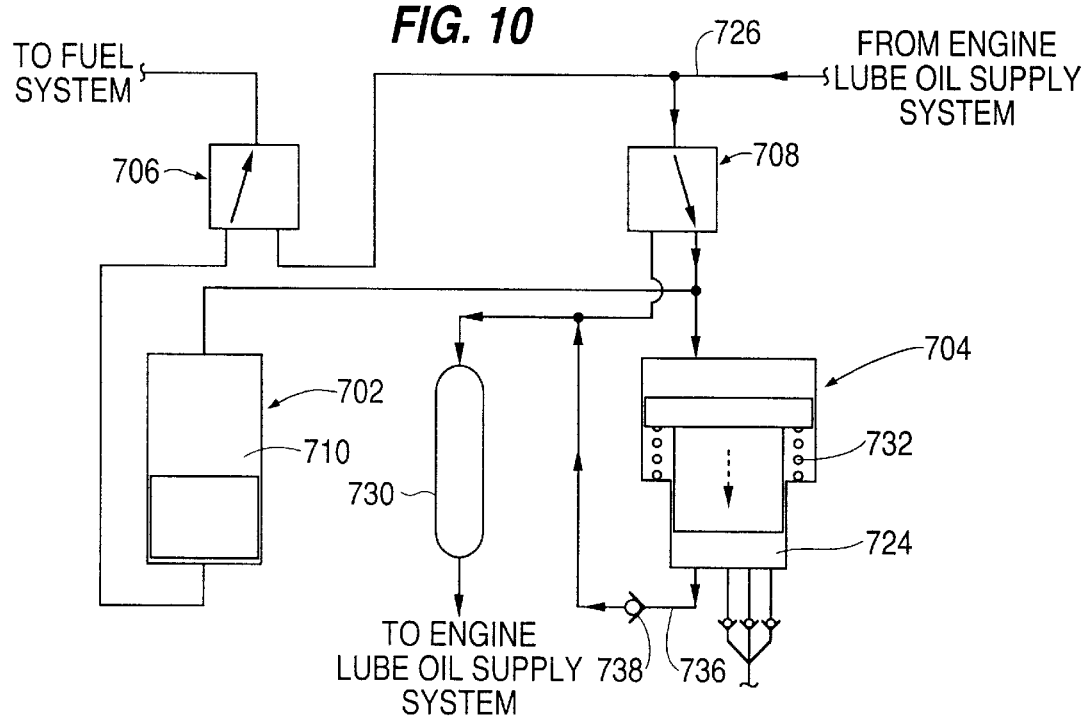
FIG. 10 is a view of the system in the replacement or makeup mode with the auxiliary pump piston moving through a discharge stroke.

Thus, auxiliary lube oil pump 704 is operated to deliver a replacement charge of fresh oil to the engine lube oil supply system to replace a portion of the oil removed and injected into the fuel system. The auxiliary lube oil pump 704 is specifically designed to deliver a quantity of fresh oil during one discharge stroke equivalent to one half of the quantity of oil delivered by the injection pump during one injection stroke. In the present embodiment, the diameters of the auxiliary lube oil piston 718 and injection piston 710 exposed to the discharge chamber 724 and removal chamber 716, respectively, are the same, while the length of the stroke of auxiliary lube oil piston 718 is one half of the stroke of injection piston 710. For example, injection piston 710 may be designed to remove one fluid ounce of used engine oil from the engine lube oil system while auxiliary lube oil piston 718 displaces one half fluid ounce of fresh oil to the oil pan/sump via common drain passage 730. After one operation of the lube oil pump system as described above with reference to FIGS. 7 and 8, auxiliary lube oil pump 704 may be operated again to supply the remaining one half fluid ounce to completely replace the one fluid ounce removed by injection pump 702. Specifically, referring to FIG. 9, upon completion of the injection and discharge strokes shown in FIG. 8, auxiliary control valve 708 is again energized to block flow of lube oil from the engine lube oil supply system into valve 708 while connecting injection actuation chamber 714 and auxiliary actuation chamber 722 to common drain passage 730. In response, biasing spring 732 forces auxiliary lube oil piston 718 upwardly, as shown in FIG. 9, toward auxiliary actuation chamber 722 forcing lube oil back to the engine sump while drawing in fresh oil into auxiliary discharge chamber 724. Meanwhile, injection control valve 706 is maintained in the de-energized state thereby preventing pressurized lube oil from the engine lube oil system from entering injection removal chamber 716. As a result, injection piston 710 is maintained in the position at the end of the injection stroke as shown in FIG. 9. Auxiliary control valve 708 may then be de-energized as shown in FIG. 10 to deliver the second replacement charge of fresh oil to the engine lube oil supply system. Subsequently, when a quantity of used oil is to be removed and injected into the fuel system as dictated by the method of the present invention described hereinabove, injection control valve 706 and auxiliary control valve 708 can both be energized to begin the cycle as shown in FIG. 7. Alternatively, auxiliary lube oil pump 704 may be selectively operated in a makeup mode to deliver makeup quantities of fresh oil from auxiliary lube tank 40 to the engine sump/lube oil supply system as desired. Of course, the second replacement quantity supplied to the engine lube oil system with reference to FIG. 9, may be omitted if the oil level in the engine sump is above a predetermined level thereby slightly lowering the sump level. Thus, auxiliary lube oil pump 704 can be operated independently of injection pump 702 to effectively compensate for any lowering of the oil sump level due to, for example, oil consumption such as oil leakage from the engine or oil burning in the cylinders. The ability to deliver very small quantities of fresh replacement and makeup lube oil to the engine permits the running oil level in the sump/pan of the engine to be more tightly controlled within a predetermined range thereby optimizing control over the quantity of lube oil in the engine's lube oil supply system.

Auxiliary lube oil piston 718 is designed with a first end positioned adjacent auxiliary actuation chamber 722 which has a cross sectional area greater than a second end of piston 718 facing auxiliary discharge chamber 724. This dual diameter design allows the pressurized lube oil acting on the large diameter area of lube oil piston 718 to always generate enough force on piston 718 to always overcome the biasing force of spring 732, high pressure check valve 738 and any frictional counterforces, regardless of engine operating conditions. Thus, even when the engine lube oil supply pressure is at a low level, such as during idle conditions, the dual diameter auxiliary lube oil piston design creates pressure forces sufficient to move auxiliary lube oil piston 718 through its discharge stroke.

Figure 11:
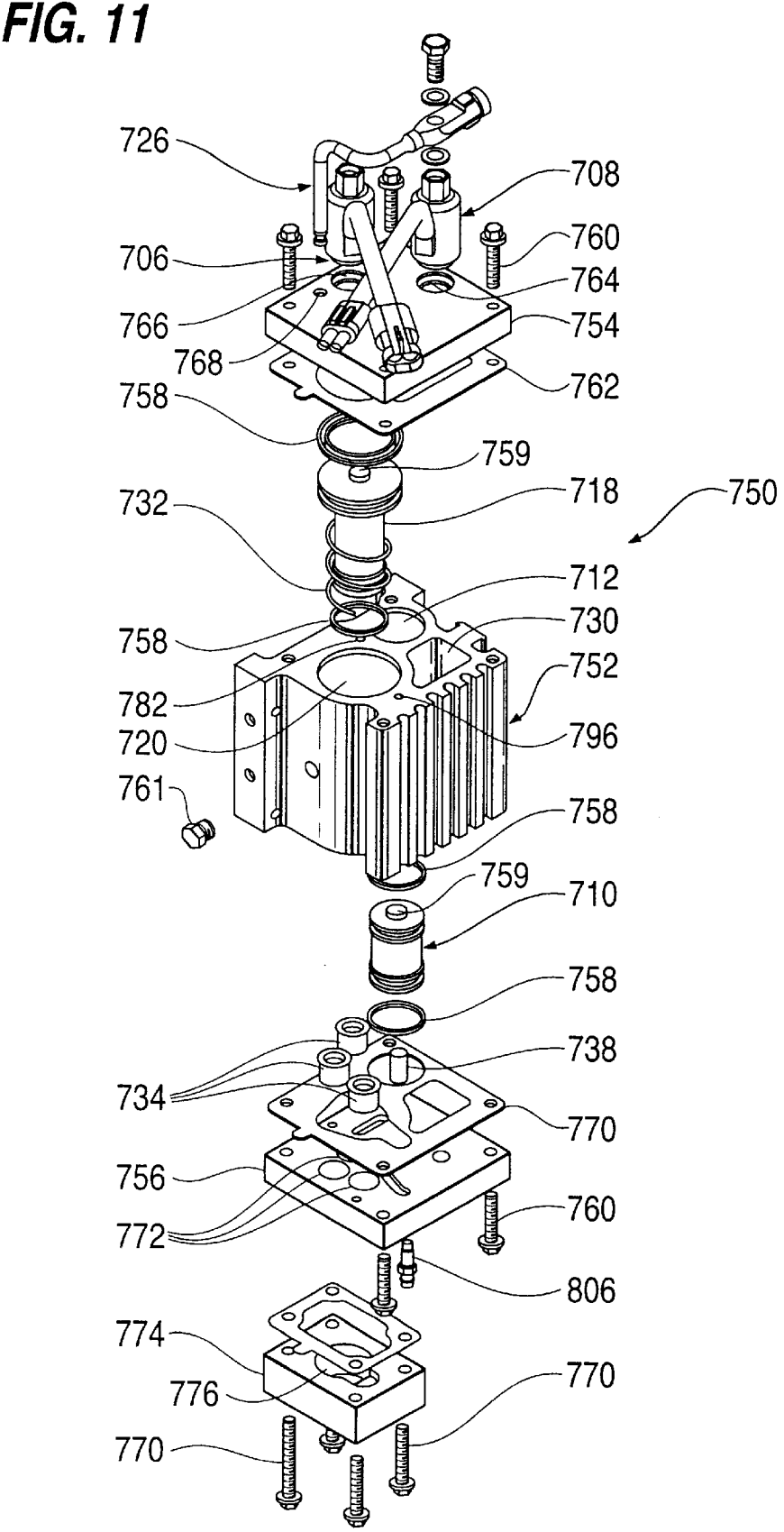
FIG. 11 is an exploded perspective view of the lube oil replacement pump assembly of the present invention.

Referring now to FIGS. 11–14d, a practical embodiment of the lube oil replacement pump assembly discussed hereinabove with respect to FIGS. 7–10 will now be described. FIG. 11 illustrates a compact lube oil replacement pump assembly including each of the components illustrated in schematic form in FIGS. 7–10. The components are specifically arranged to form a compact, highly integrated pump assembly having minimal dimensions for fitting within the packaging constraints of various engines while effectively controlling lube oil replacement and makeup. Components identified in FIGS. 7–10 which are common to FIGS. 11–14d will be referred to with like reference numerals.

Referring to FIG. 11, the pump assembly generally includes a pump housing 750 including a housing body 752, an upper end plate 754 mounted on one end of housing body 752 and a lower end plate 756 mounted on an opposite end of pump housing body 752. Housing body 752 includes injection piston bore 712 and auxiliary piston bore 720 within which are mounted injection piston 710 and auxiliary piston 718, respectively. Each end of each of the pistons includes a groove for receiving respective seals indicated generally at 758 for sliding yet sealing contact with the inner surface of the respective bores. Also, auxiliary piston 718 and injection piston 710 may include a respective cylindrical extension 759 extending from the top face of each piston to allow the effective transfer of oil flow to the passages formed in the adjacent face of the upper end plate 754 without obstruction by the respective piston. By maintaining the piston a spaced distance from the face of the upper and lower end plates, the cylindrical extension permits the flow of oil into the respective chambers and thus the generation of pressure forces against the respective piston. Also, preferably, the spring chamber portion of auxiliary piston bore 720 containing biasing spring 732 is vented to atmosphere by, for example, a vent plug 761 to prevent air in the spring chamber from impeding the movement of auxiliary piston 718.

Common drain passage 730 is also integrally formed in housing body 752 and extends completely through housing body 752. Upper end plate 754 is mounted to housing body 752 via mounting bolts 760 while a gasket 762 is positioned between body 752 and end plate 754 to create a fluid tight seal between the components. Auxiliary control valve 708 and injection control valve 706 are mounted in respective recesses 764, 766 formed in the outer surface of upper end plate 754. Supply or feed line 726 is connected to the top of auxiliary control valve 708 and to a feed port 768 formed in upper end plate 754. Lower end plate 756 is also mounted to housing body 752 with mounting bolts 760 and a gasket 770. Upper and lower end plates 754, 756 thus function to close off each end of injection piston bore 712 and auxiliary piston bore 720 while also functioning to support other components of the assembly. For instance, lower end plate 756 also includes three check valve mounting bores 772 for receiving check valve 734. Also, the mounting recesses 764, 766 and lower fluid ports for injection control valve 706 and auxiliary control valve 708 are integrated into upper end plate 754 to provide a more compact assembly while avoiding external piping. In addition, a supply connection block 774 is mounted to lower end plate 756 via mounting bolt 770 to form a supply chamber 776 for supplying fresh oil to check valves 734. Upper and lower end plates 754 and 756, housing body 752 and supply connection block 774 may be formed of a lightweight, yet sufficiently strong material, such as aluminum.

Figure 12A:
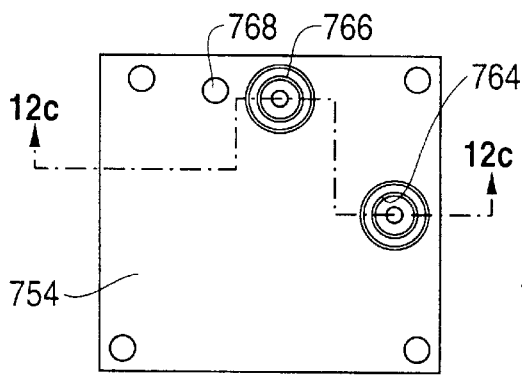
FIGS. 12a and 12b are top and bottom views, respectively, of the upper end plate of the pump assembly of FIG. 11.
Figure 12B:
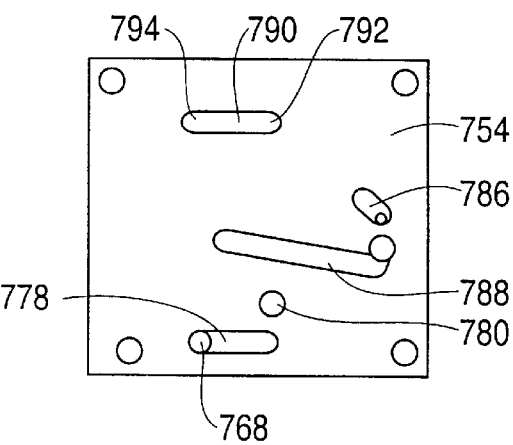
Figure 12C:
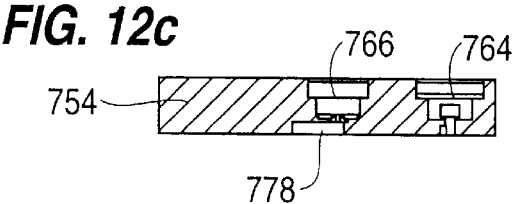
Figure 13A:
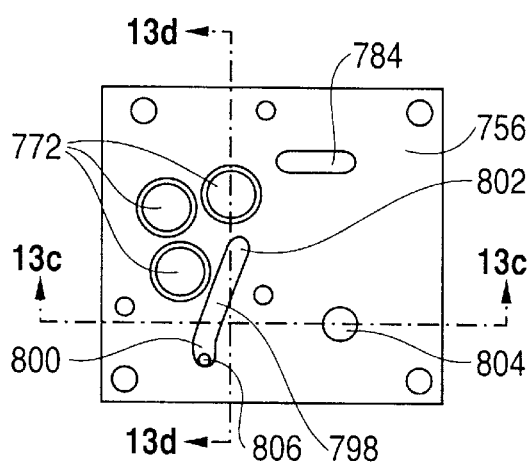
FIGS. 13a and 13b are top and bottom views, respectively, of the lower end plate of the pump assembly of FIG. 11.
Figure 13B:
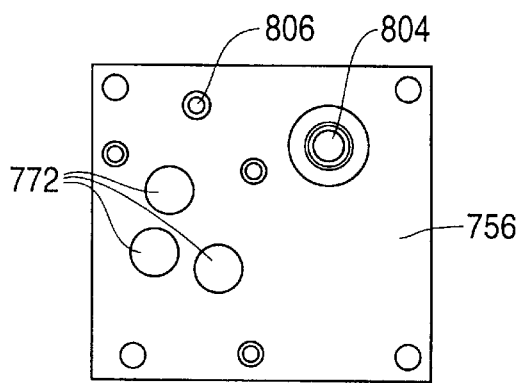
Figure 13C:
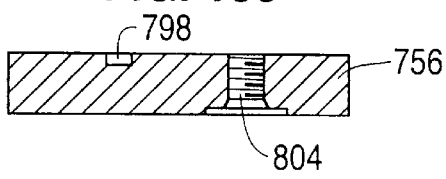
FIGS. 13c and 13d are cross-sectional views of the lower end plate of FIG. 13a taken along planes 13c—13c and 13d—13d, respectively.
Figure 13D:
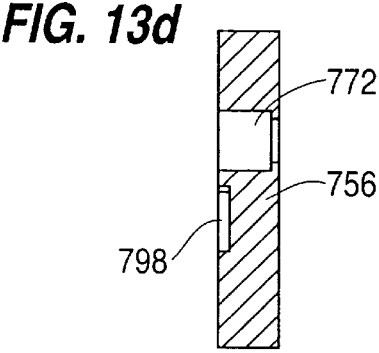
Figure 14A:
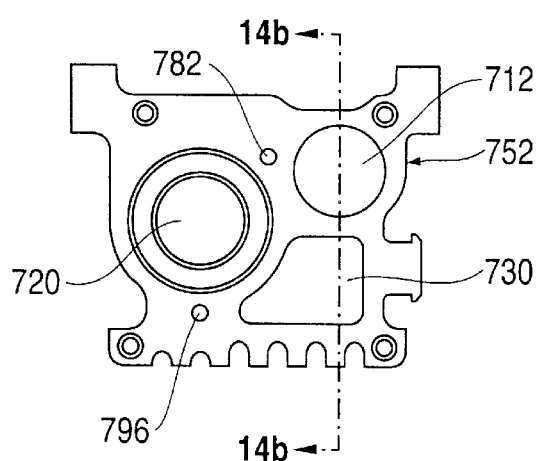
FIGS. 14a and 14c are top and bottom views of the pump housing of FIG. 11.

The flow of lube oil through pump housing 750 will now be described with reference to FIGS. 12a–14d. Referring to FIGS. 12a, 12b and 12c, feed oil from the engine lube oil system is supplied to feed port 768 and into a supply groove 778 formed on the lower side face of upper end plate 754. A recess port 780 is positioned a spaced distance from one end of supply groove 778 so as to continuously communicate with a removed oil delivery passage 782 formed in, and extending vertically through, housing body 752, as shown in FIGS. 14a and 14c. Removed oil delivery passage 782 is part of the removal passage 728 referred to in FIGS. 7–10. The lower end of removed oil delivery passage 782 communicates with one end of a groove 784 formed in the upper side surface of lower end plate 756 (FIG. 13a). Groove 784 extends a short distance to communicate with the lower end of injection removal chamber 716. The communication between supply groove 778 (FIG. 12b) and recess port 780 is controlled by injection control valve 706. When injection control valve 706 is energized, lube oil is permitted to flow through feed port 768 and supply groove 778 through the lower portion of recess 776 and into recess port 780, downwardly through removed oil delivery passage 782 and into injection removal chamber 716 via groove 784. However, when injection control valve 706 is de-energized, the plunger of injection control valve 706 will be positioned so as to prevent flow from supply groove 778 to recess port 780 as shown in FIG. 8.

Figure 14B:
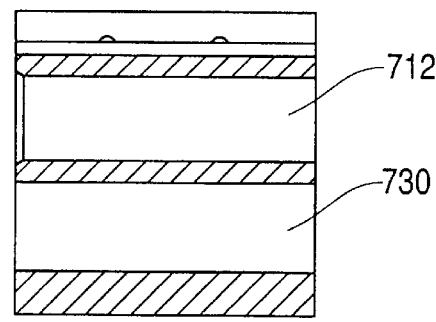
FIGS. 14b and 14d are cross-sectional views of the pump housing taken along planes 14b—14b and 14d—14d, respectively.
Figure 14C:
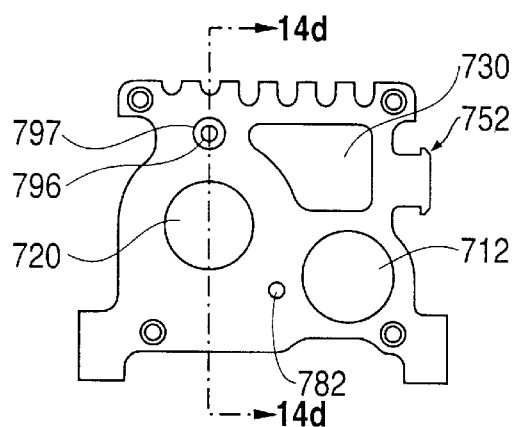
Figure 14D:
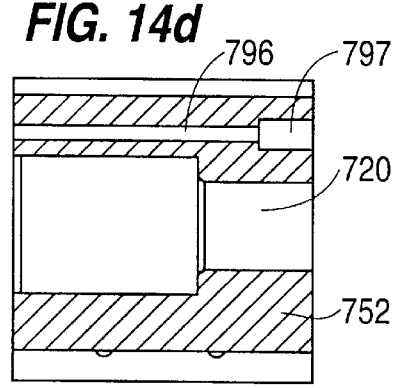

Upper end plate 754 also includes a connector groove 786 communicating at one end with the inner portion of recess 764 and at an opposite end with common drain passage 730 (FIGS. 14a–14c). Upper end plate 754 also includes a common groove 788 having one end positioned in communication with recess 764 of auxiliary control valve 708 but a spaced distance from connector groove 786. Common groove 788 extends across the lower side face of plate 754 to communicate with both auxiliary actuation chamber 722 and injection actuation chamber 714. Auxiliary control valve 708 functions to control communication between common groove 788 and connector groove 786. Specifically, when auxiliary control valve 708 is energized, as shown in FIG. 7, common groove 788 is fluidically connected to connector groove 786 to permit the flow of actuating lube oil from the respective piston chambers through connector groove 786 to common drain passage 730. When auxiliary control valve 708 is de-energized as shown in FIG. 8, flow to connector groove 786 is blocked while common groove 788 is fluidically connected to feed line 726 (FIG. 11) connected at the top of auxiliary control valve 708.

Upper end plate 754 also includes a fresh oil delivery groove 790 (FIG. 12b) having one end 792 communicating with common drain passage 730 and an opposite end 794 communicating with a fresh oil delivery passage 796 (FIG. 14a and 14d) extending vertically through housing body 752. As shown in FIGS. 13a–13d, lower end plate 756 includes a feed groove 798 formed in the upper side surface and which communicates at one end 800 with fresh oil delivery passage 796 and at an opposite end 802 with auxiliary discharge chamber 724. Fresh oil delivery passage 796 (FIGS. 14c and 14d) includes a check valve recess 797 formed at its lower end for receiving high pressure check valve 738. Thus, during the discharge stroke, relatively high pressure fresh lube oil flows out of auxiliary discharge chamber 724 through feed groove 798, upwardly through fresh oil delivery passage 796 and into common drain passage 730 via delivery groove 790. Lower end plate 756 also includes an outlet port 804 (FIGS. 13a–13c) for directing oil from common drain passage 730 to the engine sump. An air bleed port and screw 806 may be provided to bleed air from the lube oil circuit as needed.

Thus, the present pump assembly is a highly unitized design integrating the components of the lube oil replacement pump system 700 to create a compact assembly having minimal outer dimensions and reduced external plumbing which is capable of being mounted on various engines while complying with the engine packaging constraints. This advantage is achieved by integrating the injection and auxiliary bores/pistons into a single housing body; integrating many of the lube oil passages into the body and end plates; forming the control valve seat machining patterns in the end plate; and by designing auxiliary lube oil pump 704 with a stroke one half the length of injection pump 702 to minimize the height of auxiliary lube oil pump 704 thereby decreasing the overall packaging dimensions of the pump.

As described above, the embodiments of the system of FIGS. 7–10 and the practical embodiment of the pump assembly of FIGS. 11–14d are designed to provide for both the removal of used oil from the engine crankcase for delivery to the fuel system of the engine and for the automatic replacement of the removed used oil with fresh lube oil. However, in certain applications, a manual or automatic lube oil sump level detection system or procedure may be used to periodically check and maintain the level of the lube oil in the sump. For example, in many commercial applications, vehicles are subjected to frequent regular periodic preventive maintenance checks, for example, on a daily basis, during which the fluid level of various engine fluid systems are monitored by, for example, manually checking and perhaps replacing the lube oil. Therefore, many existing vehicles and maintenance procedures include existing auxiliary oil level maintenance systems such as daily preventive maintenance checks or an existing system for supplying fresh oil upon detecting a low oil sump level. FIGS. 16–19 disclose another embodiment of the present lube oil pump system which is similar to the embodiment of FIGS. 7–10 except that the system does not operate to replace the removed used oil with fresh oil. As shown in FIGS. 16–19, the present electronically controllable lube oil pump system, indicated generally at 1000, includes the same components described in the embodiment shown in FIGS. 7–10 wherein like components are referred to by the same reference numerals as previously used. However, auxiliary lube oil pump 704 functions to recycle oil removed from the engine back to the lube oil system during each discharge stroke to define a recycling period.

Figure 16:
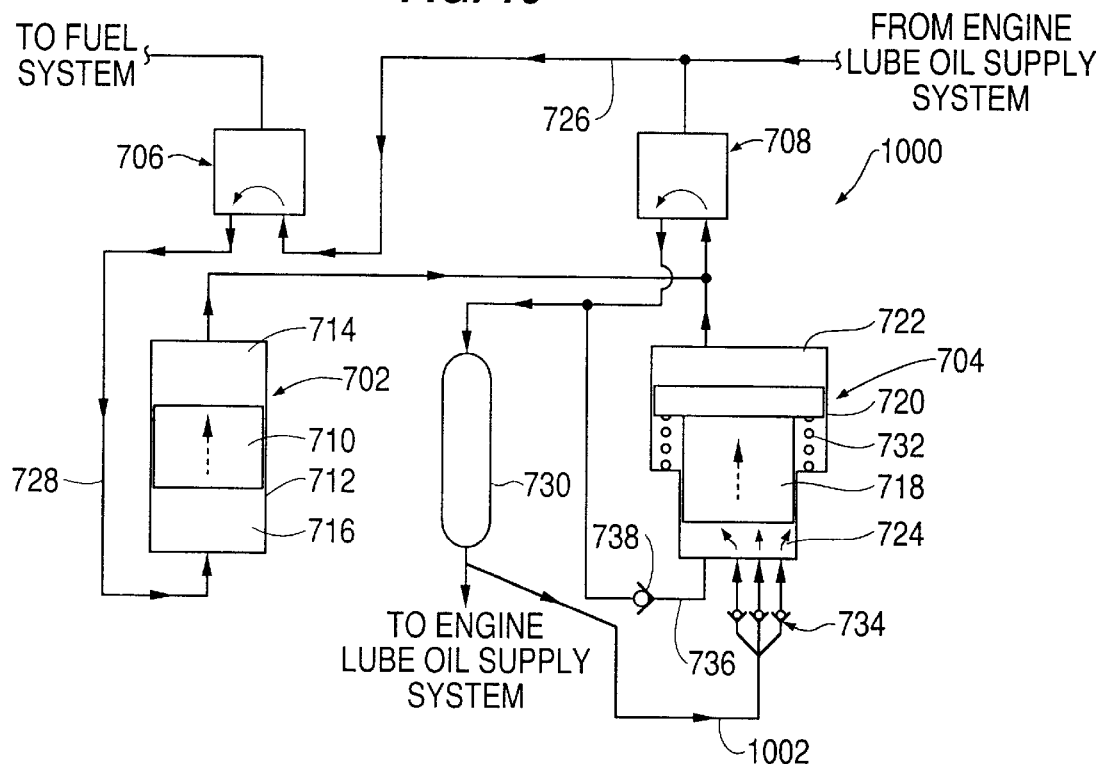
FIG. 16 is a diagrammatic view illustrating the lube oil flow circuitry and the various components of another embodiment of the lube oil replacement pump system of the present invention with the injection pump removing used lube oil from the lube oil system and the auxiliary pump advancing through a suction stroke.
Figure 17:
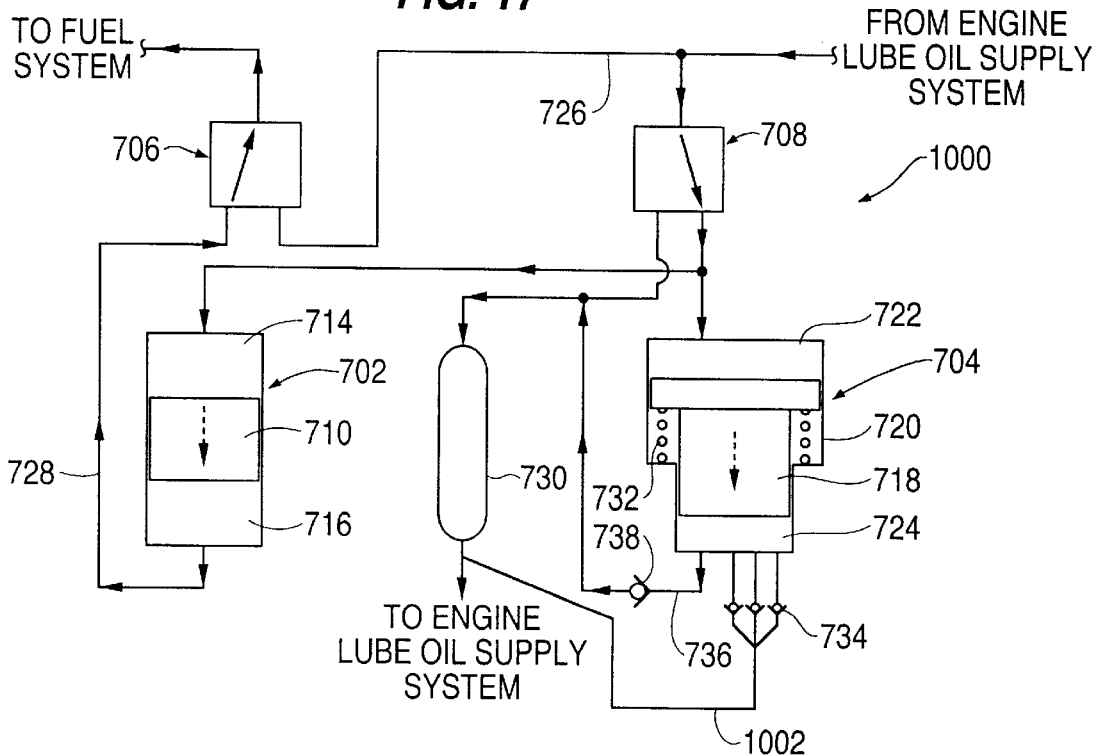
FIG. 17 is a view similar to FIG. 16, but with the injection and auxiliary pump injecting used and the auxiliary pump recycling removed used oil.
Figure 18:
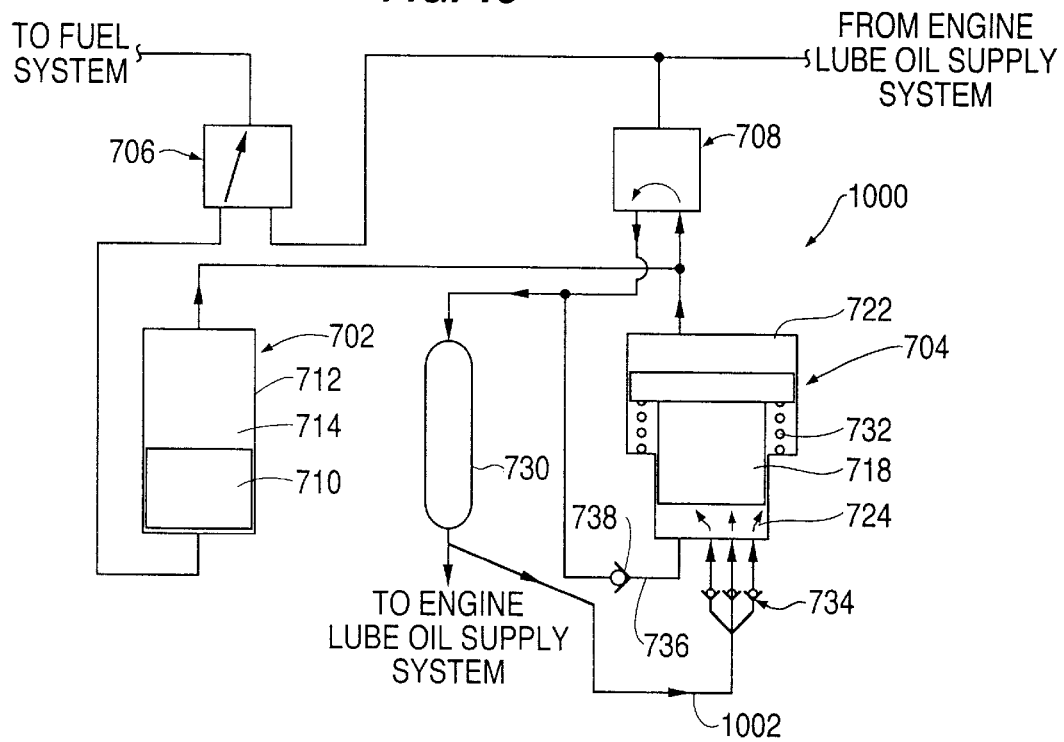
FIG. 18 is a view of the system in the recycling mode with the auxiliary pump piston moving through a suction stroke.
Figure 19:
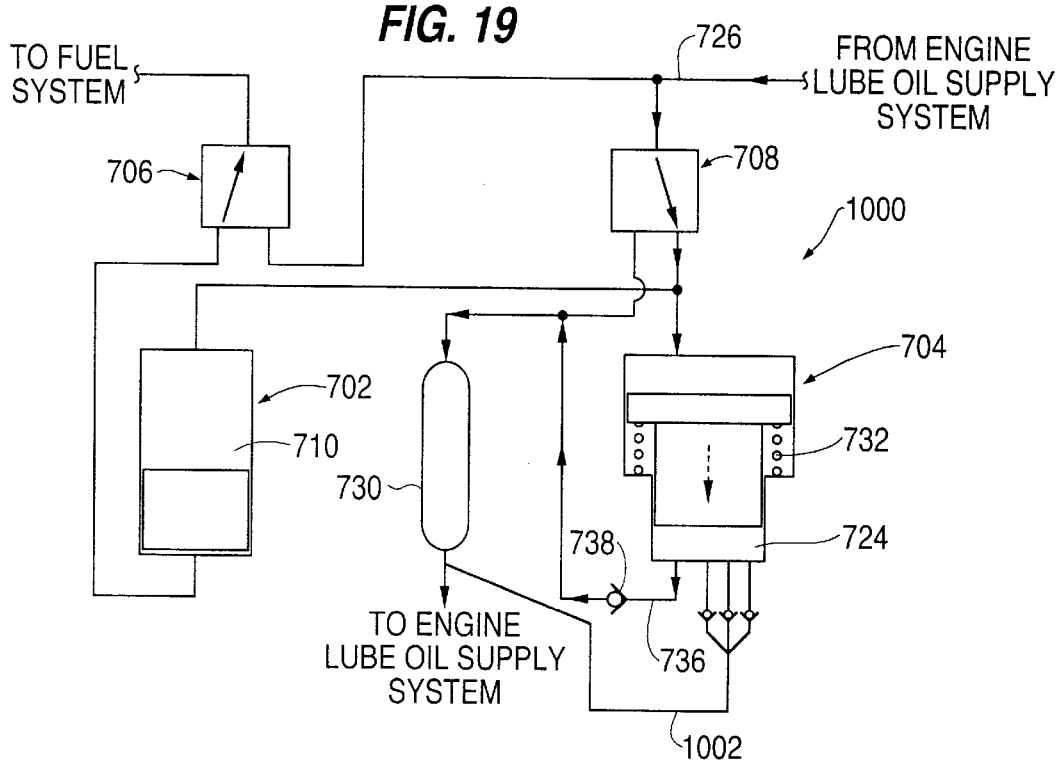
FIG. 19 is a view of the system in the recycling mode with the auxiliary pump piston moving through a discharge stroke.

Specifically, the present embodiment differs from the previous embodiment of FIGS. 7–10 in that auxiliary discharge chamber 724 is connected to common drain passage 730 or a passage downstream of common drain passage 730 and, therefore, not connected to a supply of fresh oil. As a result, during the suction stroke of auxiliary lube oil piston 718, removed used engine lube oil flows from common drain passage 730 through passage 1002 and check valves 734 into chamber 724. Thus, as shown in FIG. 16, the system is operated so that injection pump 702 takes in a full charge of used oil from the engine lube oil system into injection removal chamber 716 while auxiliary lube oil pump 704 takes in a charge of used oil into auxiliary discharge chamber 724. After a predetermined period of time, injection control valve 706 and auxiliary control valve 708 are controlled, i.e. de-energized, to deliver actuating lube oil to the respective actuating chambers while causing the removed used oil to be injected into the fuel system and the used oil in chamber 724 to be recycled to the oil pan or sump. The used oil in chamber 724 effectively functions to lubricate a seal on piston 718 thereby permitting continued effective sealed operation of the piston. Thus, piston 718 moves through the discharge stroke to deliver a fixed recycle quantity of removed used oil to the engine lube oil system to define a recycling period. Pressurized lube oil from the engine lube oil system is delivered to the actuation chambers 714 and 722 forcing injection piston 710 and auxiliary lube oil piston 718 through the injection and discharge strokes respectively, as described hereinabove with respect to the embodiment of FIGS. 7–10. Of course, as injection piston 710 moves toward injection removal chamber 716, the used oil previously removed from the engine lube oil system is injected into the fuel system. Simultaneously, however, auxiliary lube oil piston 718 does not deliver fresh lube oil to the engine. Instead, in the present embodiment, auxiliary lube oil piston 718 moves toward auxiliary discharge chamber 724 pressurizing the used oil in chamber 724 and delivering this oil through discharge passage 736 and high pressure check valve 738 to the engine lube oil supply system via common drain passage 730 thereby recycling the removed used oil. Like the previous embodiment, auxiliary lube oil pump 704 will be operated again to recycle a second fixed recycle quantity of removed used oil to the engine lube oil system. Thus, auxiliary control valve 708 is again energized to block flow of lube oil from the engine lube oil system into valve 708 while connecting injection actuation chamber 714 and auxiliary actuation chamber 722 to common drain passage 730. In response, biasing spring 732 forces auxiliary lube oil piston 718 upwardly as shown in FIG. 18, toward auxiliary actuation chamber 722 forcing lube oil back into the engine sump while drawing used oil into auxiliary discharge chamber 724 via passage 1002. Meanwhile, injection control valve 706 is maintained in the de-energized state thereby preventing pressurized oil from the engine lube oil system from entering the injection removal chamber 716. As a result, injection piston 710 is maintained in the position at the end of the injection stroke as shown in FIG. 18. Auxiliary control valve 708 may then be de-energized as shown in FIG. 19 to deliver the second charge of used oil back to the engine lube oil system. Subsequently, when a quantity of used oil is to be removed and injected into the fuel system, injection control valve 706 and auxiliary control valve 708 can both be energized to begin the cycle as shown in FIG. 16. As a result, the present system 1000 functions to effectively remove used oil and inject the used oil into an engine fuel system to avoid the cost and time associated with manual oil removal and disposal while operating in a recycle mode to avoid automatic fresh oil replacement thereby permitting the use of daily preventive maintenance checks or other auxiliary methods of replacing the oil to be used. As a result, an auxiliary lube oil tank can be avoided thereby lowering the costs of the system while allowing other existing systems or procedures to be efficiently utilized in a cost effective manner to achieve fresh oil replacement.

Referring now to FIGS. 15a–15d, another embodiment of the improved electronically controllable lube oil pump system of the present invention, indicated generally at 900, is illustrated. Lube oil pump system 900 differs from the previously discussed system of FIGS. 7–10 in that lube oil pump system 900 includes an injection and replacement pump 902 comprised of a single, multi-diameter piston 904 which functions both to remove and inject used lube oil and replace the removed oil with fresh oil thereby avoiding the need for a second, separate piston and associated passages. Moreover, the lube oil pump system 900 of the present embodiment avoids the excessive number of control valves required by conventional single piston lube oil pump designs.

Injection and replacement pump 902 is similar in structure to auxiliary lube oil pump 704 of the previous embodiment in that pump 902 includes a multi-diameter piston 904 biased by a spring 906 and including a fresh oil replacement end portion 908 forming a fresh oil chamber 910 for receiving fresh lube oil from an auxiliary lube tank (not shown). Piston 904 also includes a removed oil injection end portion 912 having a larger diameter than fresh oil replacement end portion 908. Injection end portion 912 forms a removed oil chamber 914 for receiving used lube oil being removed from the engine lube oil supply system. Used lube oil flows from the engine lube oil supply system to removed oil chamber 914 via a supply circuit 916 and a first control valve 918. Removed oil present in oil chamber 914 is injected into the engine fuel system via first control valve 918, a removed oil injection circuit 920 and a second control valve 922 as discussed more fully hereinbelow. First and second control valves 918, 922 are preferably of the three-way, two position type and preferably actuated by a solenoid assembly.

Figure 15A:
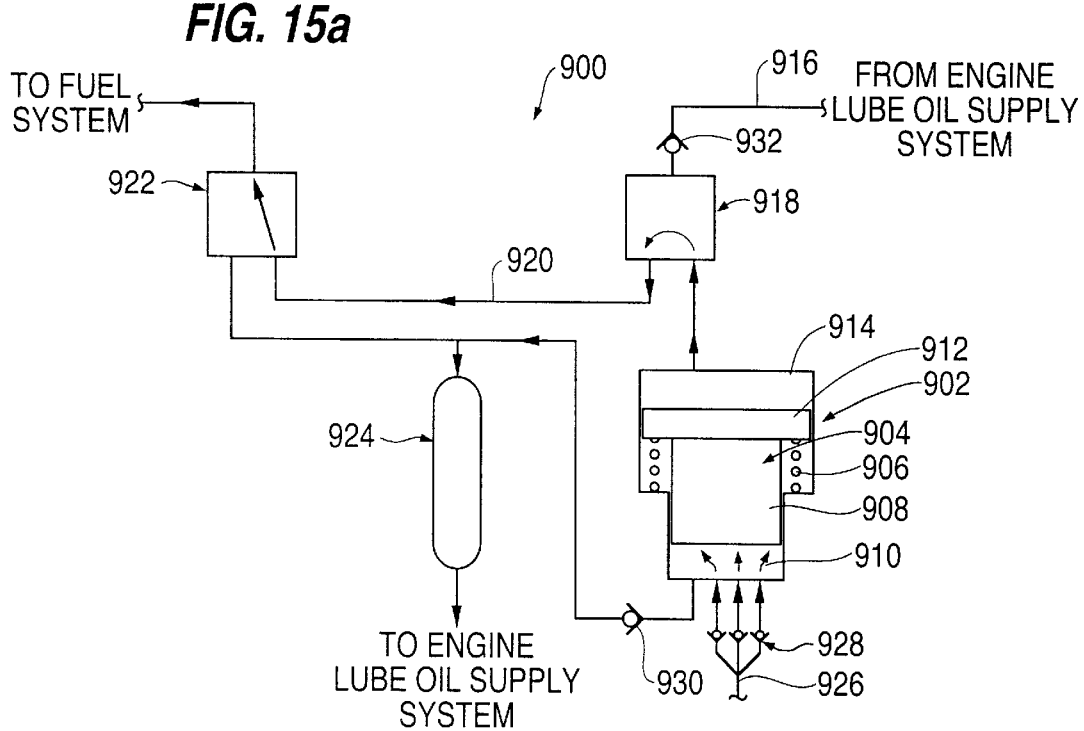
FIG. 15a is a diagrammatic view illustrating the lube oil flow circuitry and the various components of the lube oil replacement pump system of another embodiment of the present invention with the injection and replacement pump injecting removed lube oil into the engine fuel system while drawing in fresh oil via a combined injection and suction stroke.
Figure 15B:
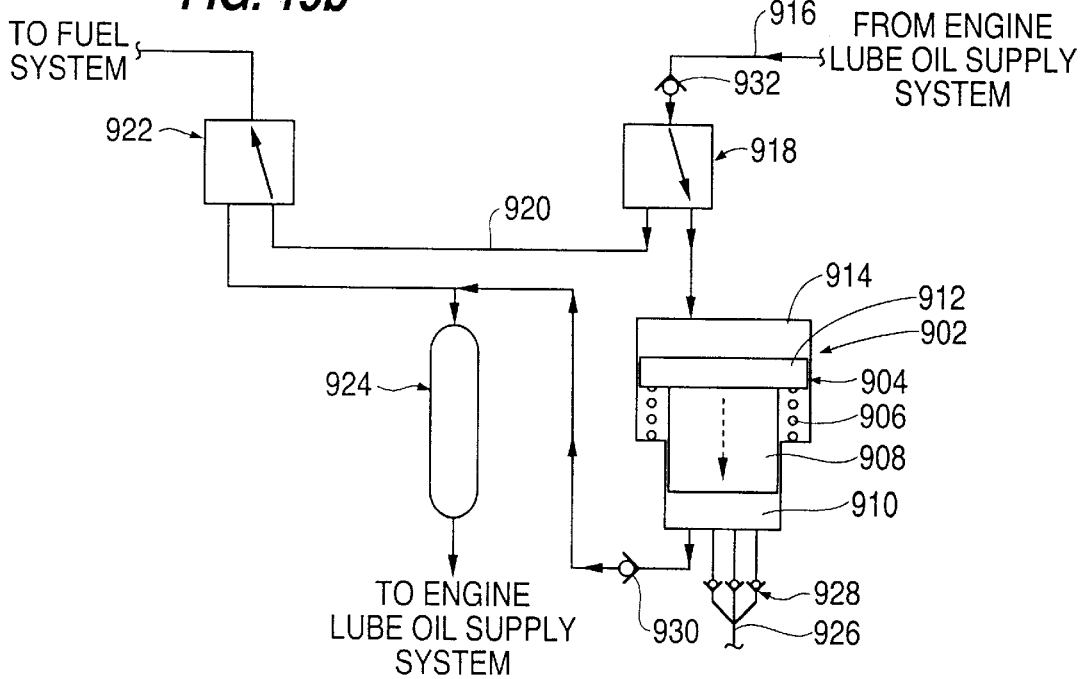
FIG. 15b is a view similar to FIG. 15a, but with the injection and replacement pump piston moving through a replacement stroke delivering fresh oil to the engine lube oil system.

The operation and improved structure and function of the present embodiment will now be discussed in detail. Referring to FIG. 15a, the lube oil pump system 900 is shown in the injection mode with first control valve 918 activated or energized so as to fluidically connect removed oil chamber 914 to removed oil injection circuit 920 thereby allowing removed oil in chamber 914 to flow through injection circuit 920 to second control valve 922. Second control valve 922 remains in the de-energized state thereby permitting oil flow from injection circuit 920 to the engine fuel system while blocking flow between injection circuit 920 and a drain circuit 924. Thus, biasing spring 906 and the pressure of the fresh oil entering fresh oil chamber 910, via a delivery passage 926 and check valves 928, moves piston 904 through an injection stroke forcing oil in oil chamber 914 to be delivered to the engine fuel system. At the end of the injection stroke, fresh oil chamber 910 has been filled with a first replacement quantity of fresh oil from the auxiliary lube oil tank. Referring to FIG. 15b, first control valve 918 is then controlled, i.e. de-energized, to fluidically connect removed oil supply circuit 916 to removed oil chamber 914 thereby allowing used lube oil from the engine lube oil supply system to flow into removed oil chamber 914. The pressurized lube oil from the engine entering removed oil chamber 914 moves piston 904 through a removal stroke, or replacement stroke, toward fresh oil chamber 910 thereby forcing the fresh or makeup lube oil into drain circuit 924 for delivery to the engine lube oil supply system. Meanwhile, second control valve 922 remains deactivated so as to block flow from drain circuit 924 back through second control valve 922. Thus, the piston 904 is moved through a first replacement stroke delivering the first replacement quantity of makeup oil to the engine lube oil supply system.

The multi-diameter design of piston 904 is important for providing the necessary replacement stroke activating force necessary to overcome the opposite forces acting on piston 904, specifically, the force of biasing spring 906, the opening biasing force of high pressure check valve 930 and any frictional counterforces resulting from the seals between piston 904 and its associated housing. As discussed hereinabove with respect to the embodiment of FIGS. 7–10, under certain engine operating conditions, the engine lube oil supply pressure acting on piston 904 may be insufficient to move piston 904 through the replacement stroke, especially in certain applications where the auxiliary lube oil pressure entering fresh oil chamber 910 is unusually high relative to the engine lube oil supply pressure. For instance, in certain applications, the auxiliary lube oil tank may be located a relatively large distance above the injection and replacement pump 902 thereby creating a head pressure in fresh oil chamber 910, such as experienced in many shipboard applications. In these situations, when the engine lube oil supply pressure is at a low level, such as during idle conditions, the removed lube oil pressure in removed oil chamber 914 may be insufficient to overcome the counterforces acting on piston 904 thereby preventing a complete, effective replacement stroke of piston 904. The multi-diameter piston 904 of the present invention overcomes this problem by decreasing the area of replacement end portion 908 exposed to the fresh oil pressure thereby decreasing the reacting force acting opposite the supply pressure induced force and permitting movement of piston 904 through a complete replacement stroke. For example, as shown in Table III, a conventional single diameter piston, having the same injection end portion and replacement end portion areas, may fail to generate a sufficient amount of resultant seating force (−6.357 lbs) necessary to move the piston completely through the replacement stroke when the lube oil supply pressure is low, i.e. 15 psi. Also shown in Table III is one embodiment of the multi-diameter piston of the present invention having a replacement end portion area which is one-half that of the injection end portion area. The multi-diameter piston of the present invention, however, generates a positive seating force of 2.629 lbs, thereby effectively moving the piston completely through the replacement stroke at low supply pressure engine conditions. Also, since the multi-diameter piston of the present invention is achieved, in part, by forming the replacement end portion 908 with a smaller diameter than the conventional single diameter piston, less spring force is required to achieve the required piston velocity during the injection strokes necessary to create sufficient suction pressure in fresh oil chamber 910 to draw the fresh oil through check valves 928.

TABLE III

| | Conventional Lube Oil Piston Assembly | Lube Oil Piston Assembly of the Present Invention |
| --- | --- | --- |
| Engine lube oil supply pressure (psi) | 15 | 15 |
| Injection end portion diameter (in) | 1.125 | 1.0625 |
| Injection end portion area (in²) | 0.994 | 0.887 |
| Injection end force (lb) | 14.910 | 13.300 |
| Injection end friction (lb) | −1.688 | −1.594 |
| Striction friction (lb) | 0 | 0 |
| Replacement end portion diameter (in) | 1.125 | 0.75 |
| Replacement end portion area (in²) | 0.994 | 0.442 |
| Replacement end friction (lb) | −1.688 | −1.125 |
| Striction friction (lb) | 0 | 0 |
| High pressure check valve pop-off pressure (psi) | 4.5 | 4.5 |
| Fresh oil pressure in fresh oil chamber (lb) | 4.473 | −1.988 |
| End of stroke Spring Force (lb) | −13.419 | −5.964 |
| Initial Suction Pressure (psi) | −13.500 | −13.500 |
| Resultant Seating Force (lb) | −6.357 | 2.629 |

Importantly, piston 904 is designed so as to deliver a first replacement quantity during the first replacement stroke which is one-half of the removed and injected quantity. Specifically, the relative diameters of removed oil injection end portion 912 and fresh oil replacement end portion 908 are sized so that for a given piston stroke, the quantity of lube oil injected from removed oil chamber 914 can be precisely compensated for by multiple replacement strokes, i.e. preferably two strokes, of piston 904. In the present embodiment, the diameters of end portions 912 and 908 are sized so that during a first replacement stroke described hereinabove, a first replacement quantity of makeup or fresh oil is delivered which is substantially one-half the quantity of the removed oil injected during the previous injection stroke of piston 904.

Figure 15C:
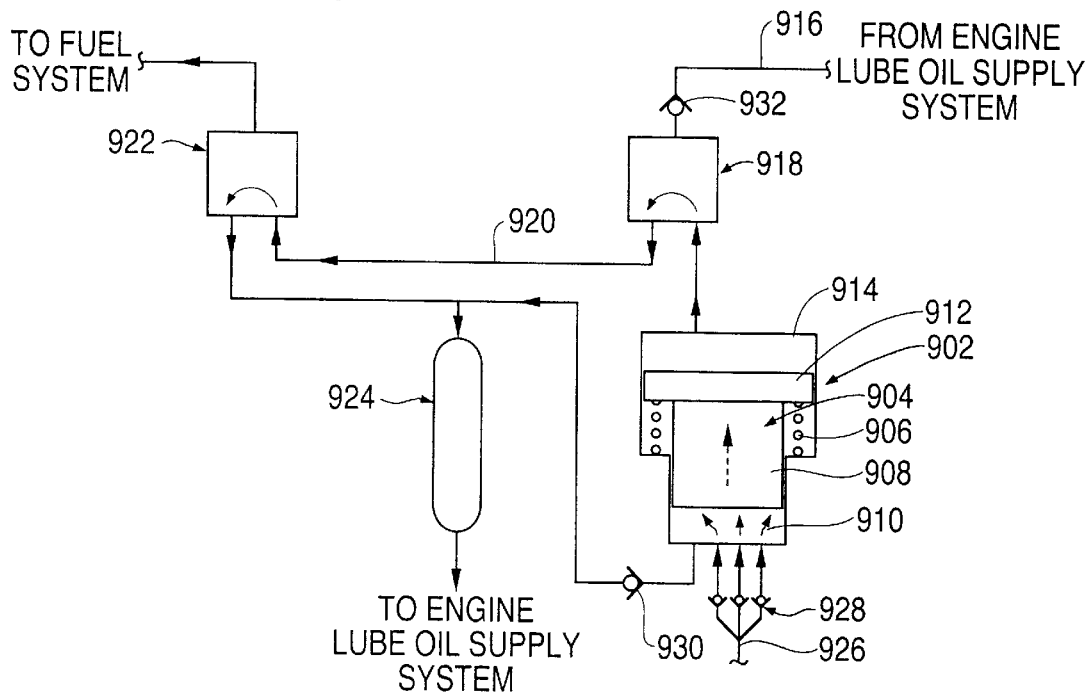
FIG. 15c is a view of the system in with the piston moving through a suction stroke while delivering removed oil back to the engine lube oil system.
Figure 15D:
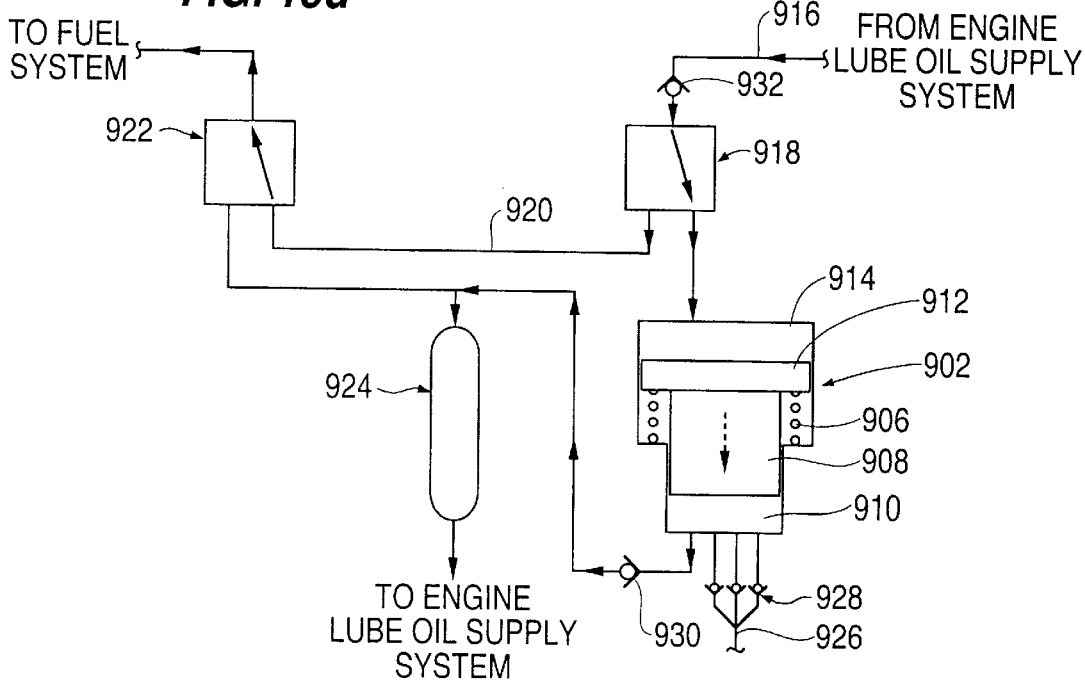
FIG. 15d is a view of the system in the pump piston moving through a replacement stroke delivering a fresh oil or makeup replacement quantity while removing used oil from the engine lube oil system.

Consequently, a second replacement stroke is desired to completely compensate for the used oil removed from the engine lube oil supply system. With reference to FIGS. 15c and 15d, one complete cycle of the present lube oil pump system 900 includes the following operation subsequent to each delivery of the first replacement quantity. First and second control valves 918, 922 are deactivated to fluidically connect removed oil chamber 914 to removed oil injection circuit 920 via first control valve 918 and connect removed oil injection circuit 920 to drain circuit 924 via second control valve 922. As a result, the biasing spring 906 forces piston 904 upwardly as shown in FIG. 15c thereby causing removed lube oil to flow through first and second control valves 918, 922 and back to the engine lube oil supply system via drain circuit 924. During this movement of piston 904, makeup lube oil flows into fresh oil chamber 910 due to its own head pressure and/or by the suction force created by piston 904 thereby creating an additional replacement quantity of fresh lube oil. Subsequently, as shown in FIG. 15d, first and second control valves 918, 922 are then deactivated causing first control valve 918 to block flow to removed oil injection circuit 920 while permitting flow from the engine lube oil system to removed oil chamber 914. Deactivation of second control valve 922 blocks flow to drain circuit 924 while permitting flow from removed oil injection circuit 920 to the engine fuel system. As a result, pressurized lube oil from the engine lube oil system flows into removed oil chamber 914 forcing piston 904 downwardly, as shown in FIG. 15d, pressurizing the fresh oil in chamber 910 to cause makeup oil flow through check valve 930 and drain circuit 924 into the engine lube oil supply system. Thus, the pressurized lube oil supply has been used to create a second replacement stroke and quantity thereby completely making up for the original removed quantity of oil from the system while avoiding removal of additional amounts of oil to operate injection and replacement pump 902 by directing the removed oil for operation back to the engine lube oil supply system. As a result, the original removed quantity has been completely and precisely replaced by an equal amount of fresh makeup lube oil delivered by two replacement strokes of piston 904.

The lube oil pump system 900 of the present embodiment also effectively minimizes the number of control valves needed to provide effective control of oil flow while avoiding additional inadvertent fresh oil makeup upon engine startup. Specifically, conventional single piston lube oil pump systems for removing and replacing lube oil require an excessive number of control valves. The present lube oil pump system 900 merely requires two control valves to effectively operate injection and replacement pump 902. In addition, check valve 932 functions to prevent the flow of lube oil from removed oil chamber 914 back through first control valve 918 when first control valve 918 is de-energized during engine shutdown. Without check valve 932, upon engine shutdown, biasing spring 906 would cause piston 904 to move upwardly, as shown in FIG. 15d, forcing lube oil through first control valve 918 back to the engine lube oil supply system. As a result, an additional, undesired charge of fresh makeup oil would be present in fresh oil chamber 910 upon engine startup. During engine startup, with first control valve 918 in the deactivated position, the engine lube oil supply system would become pressurized thereby delivering pressurized lube oil to removed oil chamber 914 and causing piston 904 to move through an additional replacement stroke delivering an undesired, additional replacement quantity to the engine lube oil supply system. Check valve 932 prevents this problem from occurring by preventing lube oil flow from removed oil chamber 914 back to the engine lube oil supply system upon engine shutdown thereby creating a hydraulic link between removed oil chamber 914 and check valve 932 which prevents movement of piston 904 through an injection stroke thereby preventing inadvertent filling of fresh oil chamber 910 and subsequent delivery of an undesired replacement quantity.

INDUSTRIAL APPLICABILITY

The present continuous lube oil replacement system may be used in any internal combustion engine having a supply of lubricating fluid for lubricating the engine's components. However, the present system is particularly useful in a compression ignition engine of any vehicle, such as a truck or boat, or industrial equipment, such as construction or earth moving machines.

We claim:

1. An electronically controllable lube oil pump system for an engine lube oil system, comprising:
   an injection pump means for removing used oil from the engine lube oil system and injecting the removed oil into an engine fuel system, said injection pump means including an injection piston reciprocally mounted for movement through an injection stroke and a removal stroke;
   an auxiliary pump means operable in a recycle mode for recycling removed oil to the engine lube oil system, said auxiliary pump means including an auxiliary piston reciprocally mounted for movement through a suction stroke and a discharge stroke;
   a first solenoid operated control valve for controlling the flow of an actuating fluid to control the operation of said injection pump means and said auxiliary pump means, said first solenoid operated control valve movable between first and second positions, wherein movement of said first solenoid operated control valve into said first position causes said injection piston to move through said injection stroke and said auxiliary piston to move through said discharge stroke.

2. The lube oil pump system of claim 1, wherein said injection pump means includes an injection piston bore for receiving said injection piston, an injection actuation chamber formed adjacent one end of said injection piston and an injection removal chamber positioned on an opposite side of said injection piston for receiving removed oil to be injected into the fuel system, further including a second solenoid operated control valve for selectively controlling the flow of removed oil to and from said injection removal chamber.

3. The lube oil pump system of claim 1, wherein said auxiliary pump means includes an auxiliary piston bore for receiving said auxiliary piston, an auxiliary actuation chamber formed adjacent one end of said auxiliary piston and an auxiliary discharge chamber positioned on an opposite side of said auxiliary piston for receiving removed used oil to be recycled into the engine lube system, said actuating fluid being pressurized engine lube oil from the engine lube oil system, said first solenoid operated control valve controlling flow of actuating fluid to and from both said injection actuation chamber and said auxiliary actuation chamber.

4. The lube oil pump system of claim 3, wherein oil from the engine lube oil system acts on a first end of said auxiliary piston to force a second end of said auxiliary piston against removed used oil so as to pressurize the removed used oil, said first end of said auxiliary piston having a greater cross-sectional area than a cross-sectional area of said second end.

5. The lube oil pump system of claim 2, wherein said first and said second solenoid operated control valves are three-way, two position valves.

6. An electronically controllable lube oil pump system for an engine lube oil system, comprising:
   an injection pump means for removing used oil from the engine lube oil system and injecting the removed oil into an engine fuel system, said injection pump means including an injection piston reciprocally mounted for movement through an injection stroke and a removal stroke, said injection piston removing a fixed quantity of used oil during each removal stroke to define a removal period;
   an auxiliary pump means operable in a recycle mode for recycling removed used oil to the engine lube oil system, said auxiliary pump means including an auxiliary piston reciprocally mounted for movement through a suction stroke and a discharge stroke, said auxiliary piston discharging a first fixed recycle quantity of removed used oil to the engine lube oil system during each discharge stroke to define a first recycling period, said first fixed recycle quantity of removed used oil being approximately half of said fixed quantity of used oil and said first recycling period occurring substantially subsequent to said removal period;
   an actuating fluid supply for moving said injection piston through said injection stroke and said auxiliary piston through said discharge stroke; and
   a control valve means for controlling the flow of said actuating fluid to control the operation of said injection pump means and said auxiliary pump means.

7. The lube oil pump system of claim 6, wherein said injection pump means includes an injection piston bore for receiving said injection piston, an injection actuation chamber formed adjacent one end of said injection piston and an injection removal chamber positioned on an opposite side of said injection piston for receiving removed oil to be injected into the fuel system, said control valve means including a first solenoid operated control valve and a second solenoid operated control valve for selectively controlling the flow of removed oil to and from said injection removal chamber.

8. The lube oil pump system of claim 7, wherein said auxiliary pump means includes an auxiliary piston bore for receiving said auxiliary piston, an auxiliary actuation chamber formed adjacent one end of said auxiliary piston and an auxiliary discharge chamber positioned on an opposite side of said auxiliary piston for receiving said first fixed recycle quantity of removed used oil to be recycled into the engine lube system, said actuating fluid supply being pressurized engine lube oil from the engine lube oil system, said first solenoid operated control valve controlling flow of actuating fluid to and from both said injection actuation chamber and said auxiliary actuation chamber.

9. The lube oil pump system of claim 8, wherein a diameter of an end of said auxiliary piston positioned in said auxiliary actuation chamber is greater than a diameter of an opposite end of said auxiliary piston positioned in said auxiliary discharge chamber.

10. The lube oil pump system of claim 7, wherein said first and said second solenoid operated control valves are three-way, two position valves.

11. The lube oil pump system of claim 6, wherein said control valve means includes a first control valve for controlling the flow of actuating fluid from said actuating fluid supply to both of said injection pump means and said auxiliary pump means and a second control valve for controlling the flow of removed oil from said injection pump means to the engine fuel system, said second control valve operable to prevent the movement of said injection piston through said removal stroke while said auxiliary pump means is being operated in said recycle mode to deliver a second fixed recycle quantity of removed used oil to the engine lube oil system.

* * * * *